United States Patent
Rennig

(10) Patent No.: US 12,362,963 B2
(45) Date of Patent: Jul. 15, 2025

(54) ELECTRONIC DEVICE, CORRESPONDING BUS COMMUNICATION SYSTEM AND METHOD OF CONFIGURING A BUS COMMUNICATION SYSTEM

(71) Applicant: STMicroelectronics Application GMBH, Aschheim-Dornach (DE)

(72) Inventor: Fred Rennig, Nandlstadt (DE)

(73) Assignee: STMICROELECTRONICS APPLICATION GMBH, Aschheim-Dornach (DE)

( * ) Notice: Subject to any disclaimer, the term of this patent is extended or adjusted under 35 U.S.C. 154(b) by 39 days.

(21) Appl. No.: 18/350,345

(22) Filed: Jul. 11, 2023

(65) Prior Publication Data

US 2024/0048404 A1 Feb. 8, 2024

(30) Foreign Application Priority Data

Aug. 2, 2022 (IT) .................. 102022000016419
Oct. 5, 2022 (IT) .................. 102022000020490

(51) Int. Cl.
*H04L 12/40* (2006.01)

(52) U.S. Cl.
CPC ........... *H04L 12/40006* (2013.01); *H04L 2012/40215* (2013.01)

(58) Field of Classification Search
CPC .................................. H04L 12/40006
USPC ........................................ 710/305
See application file for complete search history.

(56) References Cited

U.S. PATENT DOCUMENTS

| | | | | |
|---|---|---|---|---|
| 5,596,437 A | * | 1/1997 | Heins | H04L 12/28 398/112 |
| 5,675,571 A | * | 10/1997 | Wilson | H04L 12/4135 340/9.1 |
| 6,710,626 B1 | * | 3/2004 | Buhring | G06F 13/4072 326/88 |
| 8,935,450 B2 | | 1/2015 | Nierop et al. | |
| 11,588,662 B1 | * | 2/2023 | de Haas | H04L 12/40032 |

(Continued)

FOREIGN PATENT DOCUMENTS

| | | |
|---|---|---|
| CN | 103001842 B | 7/2015 |
| EP | 2571200 B1 | 10/2019 |

OTHER PUBLICATIONS

Evers, Rainer, "LIN Responder Node Position Detection-LIN Switch Method," NXP, Apr. 2022, 9 pages.

*Primary Examiner* — Paul R. Myers
(74) *Attorney, Agent, or Firm* — Slater Matsil, LLP

(57) ABSTRACT

An electronic device includes a CAN protocol controller, a first communication port configured to be coupled to a first segment of a differential bus, and a second communication port configured to be coupled to a second segment of the differential bus. A first CAN transceiver circuit is coupled to the CAN protocol controller and is configured to receive a first CAN transmission signal and to transmit a first CAN reception signal. The first CAN transceiver is configured to drive a differential voltage at the first segment of the differential bus based on the first CAN transmission signal and to sense a differential voltage at the first segment of the differential bus. The second communication port is enabled in response to a control signal being de-asserted and disabled in response to the control signal being asserted.

20 Claims, 13 Drawing Sheets

(56) References Cited

U.S. PATENT DOCUMENTS

| | | | |
|---|---|---|---|
| 2004/0001380 A1* | 1/2004 | Becca | G06F 16/90339 365/202 |
| 2004/0117537 A1* | 6/2004 | Marcel Vandensande | G05B 19/0423 710/305 |
| 2004/0120356 A1* | 6/2004 | Davenport | H04B 3/54 370/516 |
| 2006/0224776 A1* | 10/2006 | Vanderhenst | H04L 12/40032 710/1 |
| 2008/0317013 A1* | 12/2008 | Bryans | H04L 49/102 370/362 |
| 2009/0106606 A1* | 4/2009 | Duan | G06F 11/0739 714/48 |
| 2010/0274945 A1 | 10/2010 | Westrick, Jr. et al. | |
| 2010/0314950 A1* | 12/2010 | Rutkowski | H01M 10/4207 307/125 |
| 2013/0034132 A1* | 2/2013 | Kaneko | H04L 12/40039 375/219 |
| 2017/0257140 A1* | 9/2017 | De Haas | H04L 25/0298 |
| 2018/0189129 A1* | 7/2018 | Jansen | G06F 11/0796 |
| 2018/0198178 A1* | 7/2018 | Deokar | H01M 10/425 |
| 2019/0294572 A1 | 9/2019 | Rennig et al. | |
| 2019/0353336 A1 | 11/2019 | Kreuter et al. | |
| 2021/0281497 A1 | 9/2021 | Rennig | |
| 2021/0357344 A1 | 11/2021 | Rennig et al. | |
| 2023/0356248 A1* | 11/2023 | Krosschell | A01C 21/00 |

\* cited by examiner

ELECTRONIC DEVICE, CORRESPONDING BUS COMMUNICATION SYSTEM AND METHOD OF CONFIGURING A BUS COMMUNICATION SYSTEM

CROSS-REFERENCE TO RELATED APPLICATIONS

This application claims the priority to Italian Application No. 102022000016419, filed on Aug. 2, 2022 and Italian Application No. 102022000020490, filed on Oct. 5, 2022, which applications are hereby incorporated herein by their reference.

TECHNICAL FIELD

The description generally relates to devices for use in a differential communication bus, and particular embodiments relate to devices for use in a differential communication bus that operates according to a Controller Area Network (CAN) protocol (e.g., as described in specification ISO 11898-2: 2016).

BACKGROUND

In a communication network where a plurality of devices of the same type (e.g., electronic control units) are connected in a linear daisy-chain topology, the individual network addresses of the devices may be unknown at assembly or when the network is started. Depending on the application, this may be the case only once (e.g., before the first network initialization, in case each device is programmed to permanently store its individual address thereafter) or multiple times (e.g., every time the network is restarted, in case each device is not programmed to retain its individual address, which may thus be "lost" at each network restart).

An example of such networks is a communication bus that connects the (interior) lights of a vehicle, where several dozens or even hundreds of light-emitting devices are connected along one network. Since all devices are identical, their individual network addresses may be unknown at the first start of the network. During an initialization phase, each device receives an individually allocated network address, so that each device can be individually programmed (e.g., in order to vary its brightness or color).

Existing solutions may use a communication bus that operates according to the Local Interconnect Network (LIN) protocol for such applications, but the maximum data rate supported by LIN buses is 20 kbit/s (19.2 kbit/s in most cases). Due to the increasingly higher data rates required by modern applications (e.g., in order to access many individual light sources, and/or to provide a wider range of light changing dynamics to implement certain light effects), use of a communication bus that operates according to the CAN FD Light protocol has been proposed, in particular in the automotive field (e.g., as disclosed by references U.S. 2019/0294572 A1, U.S. 2021/0281497 A1, and U.S. 2021/0357344 A1 assigned to the same Applicant of the instant application).

However, the CAN protocol (or CAN FD protocol or CAN FD Light protocol) is not provided with an auto-addressing feature that could be used in the context of a communication bus having a daisy-chain topology.

SUMMARY

The description generally relates to devices for use in a differential communication bus, and particular embodiments relate to devices for use in a differential communication bus that operates according to a Controller Area Network (CAN) protocol (e.g., as described in specification ISO 11898-2: 2016).

For instance, such devices may be used in a communication bus that operates according to a CAN Flexible Data-Rate (CAN FD) protocol, in particular according to a CAN FD Light protocol (e.g., as described in the Draft Specification Proposal (DSP) CiA 604-1 CAN FD Light, version 1.0.0).

In various embodiments, the present disclosure provides electronic devices that are suitable for use in a communication bus arranged in a daisy-chain topology and operating according to a CAN protocol, particularly according to a CAN FD Light protocol. Corresponding auto-addressing methods are provided as well.

One or more embodiments contribute in providing improved solutions in the field of communication buses that operate according to a CAN protocol (e.g., CAN FD Light protocol).

According to one or more embodiments, an electronic device is provided.

One or more embodiments may relate to a corresponding bus communication system.

One or more embodiments may relate to a corresponding method of configuring a bus communication system.

In at least one embodiment, an electronic device includes a CAN protocol controller, a first communication port configured to be coupled to a first segment of a differential bus (e.g., a CAN bus) to exchange CAN signals therewith, and a second communication port configured to be coupled to a second segment of the differential bus to exchange CAN signals therewith. The device includes a first CAN transceiver circuit coupled to the CAN protocol controller and configured to receive a first CAN transmission signal therefrom and to transmit a first CAN reception signal thereto. The first CAN transceiver circuit is coupled to the first communication port and configured to drive a differential voltage at the first segment of the differential bus based on the first CAN transmission signal, and to sense a differential voltage at the first segment of the differential bus and to produce the first CAN reception signal. The second communication port is enabled in response to a control signal being de-asserted and disabled in response to the control signal being asserted. The CAN signals are passed between the first communication port and the second communication port in response to the control signal being de-asserted, and the CAN signals are not passed between the first communication port and the second communication port in response to the control signal being asserted.

One or more embodiments may thus facilitate communication in a daisy-chain differential bus that operates according to a CAN protocol.

In one or more embodiments, the electronic device includes a second CAN transceiver circuit coupled to the second communication port and configured to drive a differential voltage at the second segment of the differential bus based on a second CAN transmission signal or to sense a differential voltage at the second segment of the differential bus and to produce a second CAN reception signal. In response to the control signal being asserted, the second CAN transceiver circuit is configured to output a recessive level at the second segment of the differential bus, and the first CAN transceiver circuit is configured to drive the differential voltage at the first segment of the differential bus based on the first CAN transmission signal produced by the CAN protocol controller. In response to the control signal being de-asserted, the second CAN transceiver circuit is configured to drive the differential voltage at the second segment of the differential bus based on the first CAN reception signal produced by the first CAN transceiver circuit, and the first CAN transceiver circuit is configured to drive the differential voltage at the first segment of the differential bus as a function of the first CAN transmission signal produced by the CAN protocol controller and the second CAN reception signal produced by the second CAN transceiver circuit.

In one or more embodiments, a first OR logic gate is configured to apply OR logic processing to the control signal and the first CAN reception signal produced by the first CAN transceiver circuit and to produce the second CAN transmission signal for the second CAN transceiver circuit. A second OR logic gate is configured to apply OR logic processing to the control signal and the second CAN reception signal produced by the second CAN transceiver circuit and to produce an intermediate CAN downstream transmission signal. An AND logic gate is configured to apply AND logic processing to the intermediate CAN downstream transmission signal and the CAN transmission signal produced by the CAN protocol controller and to produce the first CAN transmission signal for the first CAN transceiver circuit.

In one or more embodiments, the CAN protocol controller is configured to transmit an acknowledge signal to the first CAN transceiver circuit in response to a CAN signal being received at the first communication port. The CAN protocol controller is configured to assert a masking signal during transmission of the acknowledge signal. The second OR logic gate is configured to apply OR logic processing to the control signal, the second CAN reception signal produced by the second CAN transceiver circuit, and the masking signal and to produce the intermediate CAN downstream transmission signal.

In one or more embodiments, a second AND logic gate is configured to apply AND logic processing to the CAN transmission signal produced by the CAN protocol controller and the first CAN reception signal produced by the first CAN transceiver circuit and to produce an intermediate CAN upstream transmission signal. The first OR logic gate is configured to apply OR logic processing to the control signal and the intermediate CAN upstream transmission signal and to produce the second CAN transmission signal for the second CAN transceiver circuit.

In one or more embodiments, a logic circuit is configured to set the first CAN transmission signal to a recessive level in response to the first CAN reception signal having a dominant level, and set the second CAN transmission signal to a recessive level in response to the second CAN reception signal having a dominant level.

In one or more embodiments, the logic circuit includes a first NOR logic gate and a second NOR logic gate. The first NOR logic gate is configured to apply NOR logic processing to the second CAN reception signal and to an output signal from the second NOR logic gate and to produce a first blocking signal. The second NOR logic gate is configured to apply NOR logic processing to the first CAN reception signal and to an output signal from the first NOR logic gate and to produce a second blocking signal. The second CAN transmission signal is forced to a recessive level in response to the first blocking signal being asserted. The first CAN transmission signal is forced to a recessive level in response to the second blocking signal being asserted.

In one or more embodiments, the logic circuit further includes a first OR/NOR logic gate and a second OR/NOR logic gate. The first OR/NOR logic gate is configured to apply OR logic processing to the first blocking signal and to a NOR output signal from the second OR/NOR logic gate and to produce a third blocking signal. The second OR/NOR logic gate is configured to apply OR logic processing to the second blocking signal and to a NOR output signal from the first OR/NOR logic gate and to produce a fourth blocking signal. The second CAN transmission signal is forced to a recessive level in response to the third blocking signal being asserted. The first CAN transmission signal is forced to a recessive level in response to the fourth blocking signal being asserted.

In one or more embodiments, the logic circuit further includes an AND logic gate, a first set-reset flip-flop and a second set-reset flip-flop. The AND logic gate is configured to apply AND logic processing to the second CAN reception signal and to the first CAN reception signal and to produce a reset signal. The first set-reset flip-flop is configured to receive the first blocking signal at a set input terminal and the reset signal at a reset input terminal and to produce a third blocking signal at a data output terminal. The second set-reset flip-flop is configured to receive the second blocking signal at a set input terminal and the reset signal at a reset input terminal and to produce a fourth blocking signal at a data output terminal. The second CAN transmission signal is forced to a recessive level in response to the third blocking signal being asserted. The first CAN transmission signal is forced to a recessive level in response to the fourth blocking signal being asserted.

In one or more embodiments, the first NOR logic gate is configured to apply NOR logic processing to the second CAN reception signal and to the fourth blocking signal and to produce the first blocking signal, and the second NOR logic gate is configured to apply NOR logic processing to the first CAN reception signal and to the third blocking signal and to produce the second blocking signal.

In one or more embodiments, a set of switches is arranged between the first communication port and the second communication port and is controlled by the control signal. The second communication port is coupled in parallel to the first communication port in response to the control signal being de-asserted, and is decoupled from the first communication port in response to the control signal being asserted.

In one or more embodiments, the first CAN transceiver circuit is coupled to the second communication port in response to the control signal being de-asserted and to drive the differential voltage at the second segment of the differential bus based on the first CAN transmission signal, and to sense a differential voltage at the second segment of the differential bus and to produce the first CAN reception signal.

In one or more embodiments, the CAN protocol controller is configured to encode or decode frames according to a CAN protocol. In various embodiments, the CAN protocol may be a CAN FD protocol, or a CAN FD Light protocol for transmission over the differential bus.

In at least one embodiment, the present disclosure provides a differential bus communication system that includes a commander device, a first responder device, and a second responder device. The commander device includes a CAN protocol controller, a CAN transceiver circuit coupled to the CAN protocol controller, and a communication port coupled to the CAN transceiver circuit and connected to a first end of a first segment of a differential bus to exchange CAN signals therewith. The first communication port of the first responder device is connected to the first segment of the differential bus to exchange CAN signals therewith and the second communication port of the first responder device is connected to a second segment of the differential bus to exchange CAN signals therewith. The first communication port of the second responder device is connected to the second segment of the differential bus to exchange CAN signals therewith and the second communication port of the second responder device is connected to a third segment of the differential bus to exchange CAN signals therewith.

In one or more embodiments, the differential bus communication system includes termination resistors coupled in parallel to the communication ports of the commander device, the first responder device, and the second responder device.

In at least one embodiment, a method of configuring a differential bus communication system according to one or more embodiments includes: sending, from the commander device to the first responder device via the first segment of the differential bus using a default bus address, a first configuration frame including instructions for setting a univocal bus address for the first responder device; receiving the first configuration frame at the first responder device and storing the univocal bus address for the first responder device in a memory area of the first responder device; enabling the second communication port of the first responder device by de-asserting the control signal of the first responder device; sending, from the commander device to the second responder device via the first segment and the second segment of the differential bus using a default bus address, a second configuration frame including instructions for setting a univocal bus address for the second responder device; receiving the second configuration frame at the second responder device and storing the univocal bus address for the second responder device in a memory area of the second responder device; and enabling the second communication port of the second responder device by de-asserting the control signal of the second responder device.

In one or more embodiments, the first configuration frame includes instructions for enabling an acknowledge function of the first responder device, and the method includes sending, from the first responder device to the commander device via the first segment of the differential bus, an acknowledge bit in response to a frame being received at the first responder device.

In one or more embodiments, the method includes masking the stream received from the second segment of the differential bus at the second communication port of the first responder device while sending the acknowledge bit by the first responder device.

In one or more embodiments, the method includes sending for a second time the first configuration frame in response to the commander device failing to receive the acknowledge bit from the first responder device after having sent the first configuration frame for the first time.

BRIEF DESCRIPTION OF THE DRAWINGS

For a more complete understanding of one or more embodiments of the present disclosure, and the advantages thereof, reference is now made to the following descriptions taken in conjunction with the accompanying drawings, in which.

DETAILED DESCRIPTION OF ILLUSTRATIVE EMBODIMENTS

In the ensuing description, one or more specific details are illustrated, aimed at providing an in-depth understanding of examples of embodiments of this description. The embodiments may be obtained without one or more of the specific details, or with other methods, components, materials, etc. In other cases, known structures, materials, or operations are not illustrated or described in detail so that certain aspects of embodiments will not be obscured.

Reference to "an embodiment" or "one embodiment" in the framework of the present description is intended to indicate that a particular configuration, structure, or characteristic described in relation to the embodiment is included in at least one embodiment. Hence, phrases such as "in an embodiment" or "in one embodiment" that may be present in one or more points of the present description do not necessarily refer to one and the same embodiment. Moreover, particular configurations, structures, or characteristics may be combined in any adequate way in one or more embodiments.

The headings/references used herein are provided merely for convenience and hence do not define the extent of protection or the scope of the embodiments.

Throughout the figures annexed herein, unless the context indicates otherwise, like parts or elements are indicated with like references/numerals and a corresponding description will not be repeated for the sake of brevity.

Figure 1:
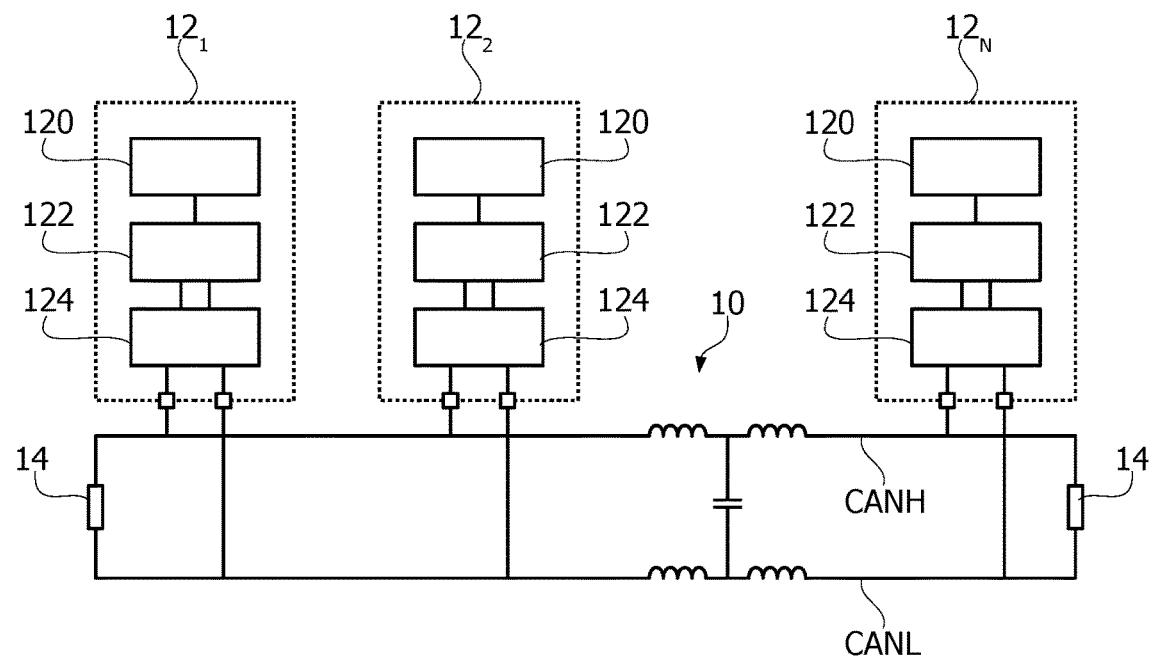
FIG. 1 is a circuit diagram exemplary of a communication bus that operates according to a CAN protocol, such as a CAN FD Light protocol.

By way of introduction to the detailed description of exemplary embodiments, reference may first be made to FIG. 1, which is a circuit diagram exemplary of a conventional communication bus (or network) 10 that operates according to a CAN protocol (e.g., a CAN FD protocol or a CAN FD Light protocol). In this example, a plurality of devices (e.g., electronic control units) $12_1$, $12_2$, ..., $12_N$ are connected with short connectors to one long differential bus 10 that includes a first wire (or line) CANH and a second wire (or line) CANL. The differential bus 10 is terminated at each end by a respective termination resistor 14 (e.g., each having a resistance $R_T$=120Ω), and the differential characteristic impedance between wire CANH and wire CANL may be equal to $Z_{DIFF}$=120Ω or $Z_{DIFF}$=100Ω.

As exemplified in FIG. 1, each of the devices $12_1$, $12_2$, ..., $12_N$ may include a control circuit 120 (e.g., a microcontroller), a protocol controller 122 (e.g., a CAN controller) and a transceiver circuit 124 (e.g., a CAN transceiver). The transceiver circuit 124 may have differential terminals coupled to the wires of the differential bus 10. In the present description, the wording "CAN controller" or "CAN protocol controller" is intended to possibly include a CAN FD protocol controller or a CAN FD Light protocol controller, insofar as the CAN FD and CAN FD Light protocols are compatible with the CAN protocol.

Figure 2:
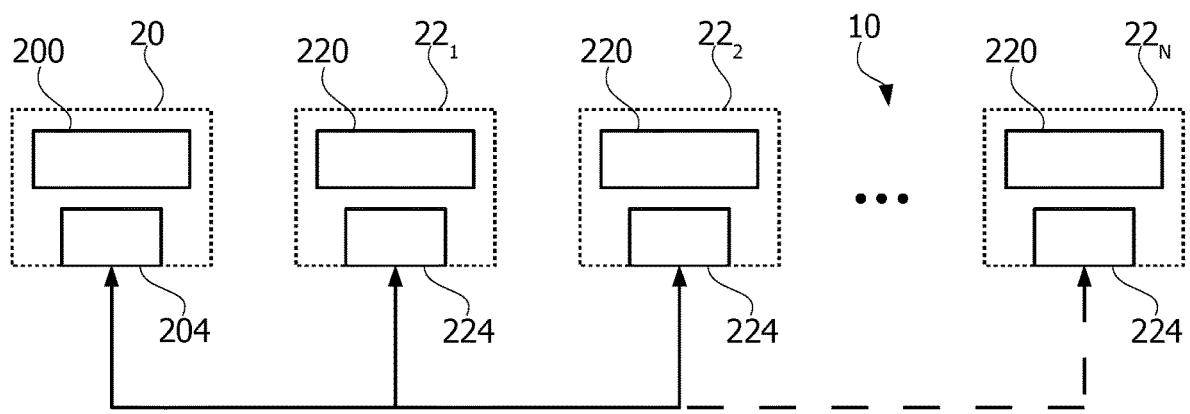
FIG. 2 is another circuit diagram exemplary of a conventional communication bus that operates according to a CAN protocol, such as a CAN FD Light protocol.

FIG. 2 is a simplified circuit diagram exemplary of another communication bus 10 (e.g., a CAN FD Light bus), where the termination resistors 14 and the differential wires CANH, CANL are not illustrated for the sake of ease of illustration. Here, since the CAN FD Light protocol is based on a commander-responder architecture (e.g., a master-slave architecture), a commander device 20 (e.g., operating as a communication master) and a plurality of responder devices $22_1$, $22_2$, ..., $22_N$ (e.g., operating as communication slaves) are connected to the bus 10. The commander device 20 may include a controller 200 (e.g., including a microcontroller and/or a CAN protocol controller) and a CAN transceiver device 204 coupled to the differential bus 10. Each of the responder devices $22_1$, $22_2$, ..., $22_N$ may include a controller 220 (e.g., including a microcontroller and/or a CAN protocol controller) and a CAN transceiver device 224 coupled to the differential bus 10. In FIG. 2, the dashed line and dots between device $22_2$ and device $22_N$ indicate that more responder devices may be connected to the same bus 10 in a similar way.

In one or more embodiments, the topology of a CAN bus (e.g., a CAN FD Light bus) can be different from that discussed with reference to FIGS. 1 and 2. In particular, as exemplified in the simplified circuit diagrams of FIGS. 3 and 4, the lines of a differential communication bus 30 may be "cut" in different segments $30_1$, $30_2$, ..., $30_N$, where each segment connects a preceding (or previous, or downstream) device to a following (or next, or upstream) device so as to implement a daisy-chain topology. Such a daisy-chain topology allows to disconnect all upstream devices by each responder device individually (e.g., it allows to "interrupt" the communication at any point of the bus 30).

Figure 3:
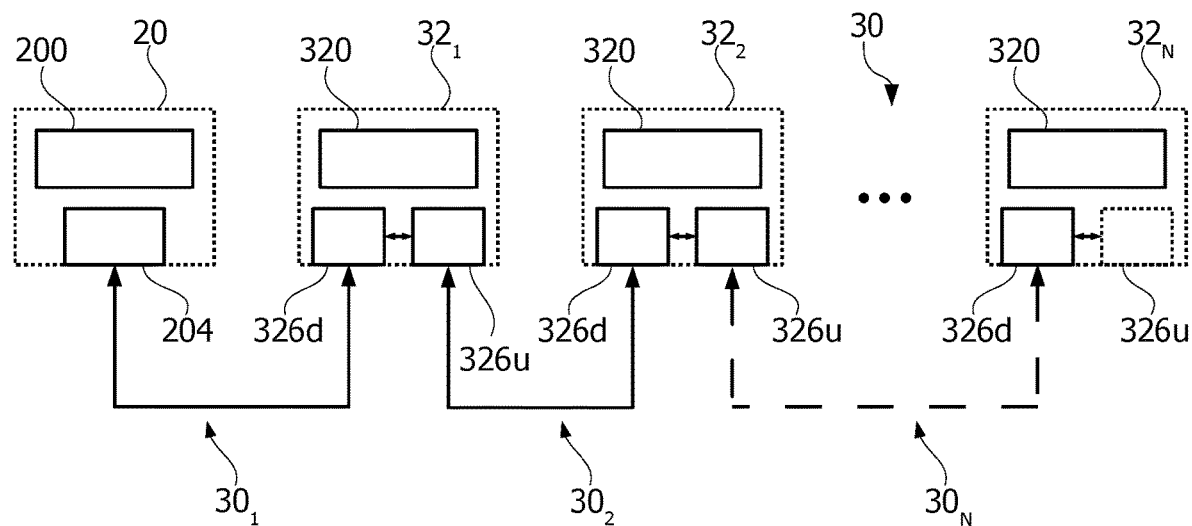
FIG. 3 is a circuit diagram exemplary of a daisy-chain communication bus that operates according to a CAN protocol, such as a CAN FD Light protocol, according to one or more embodiments of the present description.

As exemplified in FIG. 3, a commander device 20 and a plurality of responder devices $32_1$, $32_2$, ..., $32_N$ may be connected to the differential bus 30. As discussed previously, the commander device 20 may include a controller 200 and a CAN transceiver device 204 coupled to the differential bus 30, in particular coupled to the first end of the first bus segment $30_1$. Each of the responder devices $32_1$, $32_2$, ..., $32_N$ may include a controller 320 (e.g., including a microcontroller and/or a CAN protocol controller) and a CAN transceiver device 324 (not visible in FIG. 3). The CAN transceiver device 324 is coupled to a downstream port 326d for connecting to a respective downstream segment of the bus 30 (e.g., segment $30_1$ for device $32_1$) and is selectively couplable to an upstream port 326u for connecting to a respective upstream segment of the bus 30 (e.g., segment $30_2$ for device $32_1$). In FIG. 3, the dashed line and dots between device $32_2$ and device $32_N$ again indicate that more devices may be connected to the same bus 30 in a similar way. Therefore, as exemplified in FIG. 3, each bus participant (possibly excluding the first participant 20 and the last participant $32_N$) includes a single CAN transceiver 324, a downstream port 326d connected to a previous device, and an upstream port 326u connected to a next device, with the downstream port 326d coupled to the transceiver 324 and the upstream port 326u selectively couplable to the transceiver 324. The communication between the downstream port 326d and the upstream port 326u is thus implemented within each device 32. The last (responder) device $32_N$ needs only a downstream port 326d, while the first (commander) device 20 needs only an upstream port (e.g., transceiver 204). Therefore, the first (commander) device 20 may be implemented as a conventional single-port CAN FD Light commander device, and the last (responder) device $32_N$ may be implemented as a conventional single-port CAN FD Light responder device.

Figure 4:
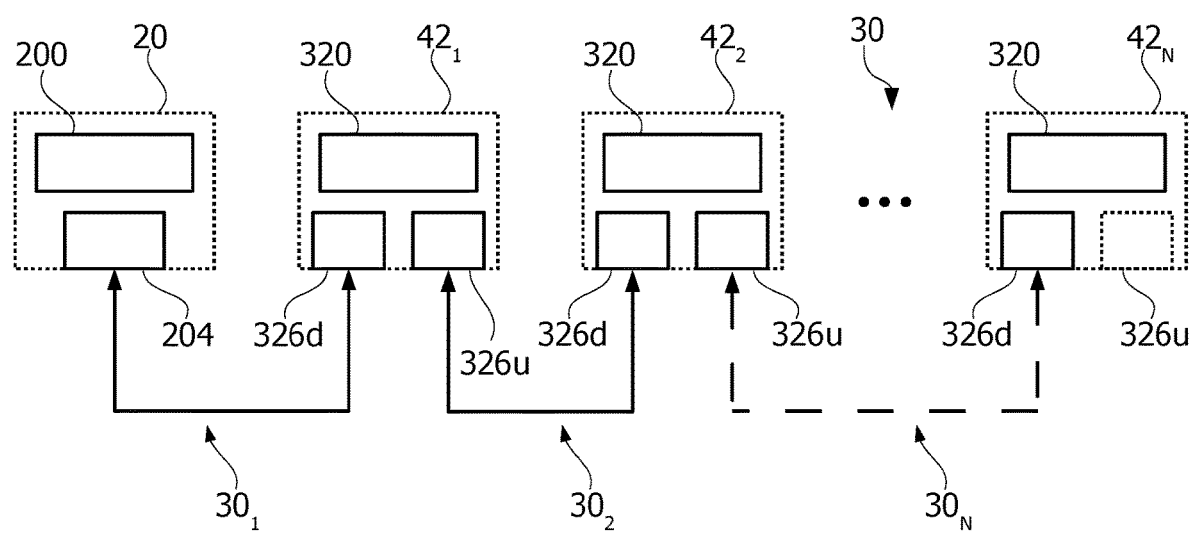
FIG. 4 is a circuit diagram exemplary of another daisy-chain communication bus that operates according to a CAN protocol, such as a CAN FD Light protocol, according to one or more embodiments of the present description.

FIG. 4 is a simplified circuit diagram exemplary of another possible implementation of the communication bus 30 with a daisy-chain topology. Here, a commander device 20 and a plurality of responder devices $42_1$, $42_2$, ..., $42_N$ may be connected to the differential bus 30. As discussed previously, the commander device 20 may include a controller 200 and a CAN transceiver device 204 coupled to the differential bus 30, in particular coupled to the first end of the first bus segment $30_1$. Each of the responder devices $42_1$, $42_2$, ..., $42_N$ may include a controller 320 (e.g., including a microcontroller and/or a CAN protocol controller) and a pair of CAN transceiver devices 324u and 324d (not visible in FIG. 4). A downstream CAN transceiver device 324d is coupled to a downstream port 326d for connecting to a respective downstream segment of the bus 30 (e.g., segment $30_1$ for device $42_1$). An upstream CAN transceiver device 324u is coupled to an upstream port 326u for connecting to a respective upstream segment of the bus 30 (e.g., segment $30_2$ for device $42_1$). In FIG. 4, the dashed line and dots between device $42_2$ and device $42_N$ again indicate that more devices may be connected to the same bus 30 in a similar way. Therefore, as exemplified in FIG. 4, each bus participant (possibly excluding the first participant 20 and the last participant $42_N$) includes a downstream transceiver 324d coupled to a downstream port 326d connected to a previous device, and an upstream transceiver 324u coupled to an upstream port 326u connected to a next device. The upstream transceiver 324u may be selectively enabled as further discussed in the following. Similarly to the architecture of FIG. 3, the last (responder) device $42_N$ needs only a downstream transceiver 324d and downstream port 326u, while the first (commander) device 20 needs only an upstream transceiver and upstream port (e.g., transceiver 204). Therefore, the first (commander) device 20 may be implemented as a conventional single-transceiver, single-port CAN FD Light commander device, and the last (responder) device $32_N$ may be implemented as a conventional single-transceiver, single-port CAN FD Light responder device.

As previously discussed, in some networks many devices of the same type are connected to the same bus. The number of devices can vary from a few devices up to several dozens, even hundreds, in some cases. A communication network for the car (interior) lights is exemplary of one such application, where many light-emitting devices are connected to the same bus. Since each device requires an individual address to be accessed (e.g., individually controlled), the various devices need to get one dedicated (e.g., individual) address assigned. In order to assign the individual addresses before connecting the devices to the bus (e.g., in the car), the address and the position of each device should be known, which entails a high logistical effort on the manufacturer side. Therefore, it is desirable to assign the individual addresses once the devices are assembled (e.g., connected) to the bus and they are in their right position (e.g., it is desirable to implement an auto-addressing functionality). In order to implement such an auto-addressing procedure, the commander device 20 of the daisy-chained bus 30 should be able to communicate with the responder devices sequentially (e.g., to initially communicate with the first responder device and assign a specific address thereto, then communicate with the second responder device via the first responder device and assign a specific address thereto, and so on until the last responder device of the chain has been assigned its specific address).

Figure 5:
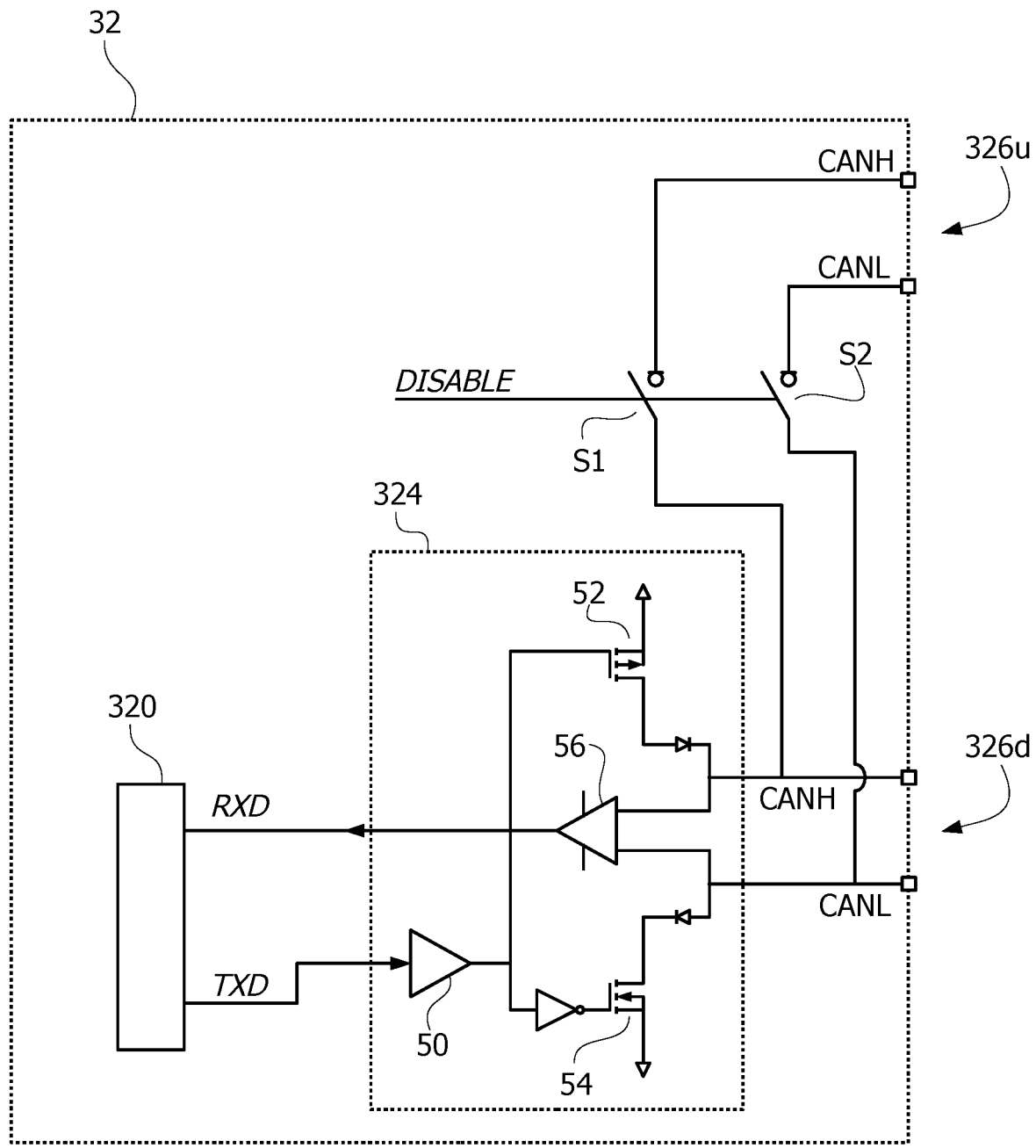
FIG. 5 is a circuit block diagram exemplary of the architecture of a responder device according to one or more embodiments of the present description, for use in the communication bus of FIG. 3.

In one or more embodiments as exemplified in FIG. 3, an auto-addressing procedure may be implemented by responder devices 32 having the architecture exemplified in the circuit diagram of FIG. 5. Here, it is shown that each responder device 32 (i.e., each responder device of the type including a single CAN transceiver 324 and a pair of ports 326d, 326u) may include a CAN protocol controller (e.g., a CAN FD Light protocol controller) 320 coupled to a single CAN transceiver 324. The CAN transceiver 324 receives a transmission signal TXD from the protocol controller 320. The transmission signal TXD is processed by a transmitter circuit 50 and propagated to a CAN driver circuit having a structure known per se to drive the downstream port 326d and optionally the upstream port 326u. For instance, the CAN driver circuit may include a high-side p-channel MOS driver transistor 52 controlled by signal TXD and coupled between wire CANH of the downstream port 326d and ground, and a low-side n-channel MOS driver transistor 54 controlled by the complement of signal TXD and coupled between wire CANL of the downstream port 326d and ground. The CAN transceiver 324 may further include a receiver circuit 56 coupled to wires CANH and CANL of the downstream port 326d and configured to produce a reception signal RXD that is propagated to the protocol controller 320. Additionally, as previously discussed with reference to FIG. 3, the responder device 32 may include an upstream port 326u including respective wires CANH and CANL. Wire CANH of port 326u may be selectively coupled to wire CANH of port 326d (e.g., to the high-side output of transceiver 324) via a first switch S1, and wire CANL of port 326u may be selectively coupled to wire CANL of port 326d (e.g., to the low-side output of transceiver 324) via a second switch S2. Switches S1 and S2 are designed so as to have a low impedance (e.g., as low as possible) and to be matched (e.g., as matched as possible). Switches S1 and S2 are controlled by the same control signal DISABLE (e.g., they are open when signal DISABLE is asserted, e.g., DISABLE='1', and closed when signal DISABLE is de-asserted, e.g., DISABLE='0'). Therefore, when signal DISABLE is asserted the upstream port 326u is disconnected from the downstream port 326d and from the transceiver 324, so that the daisy-chain is interrupted and the responder device 32 only communicates with the downstream portion of bus 30 (e.g., towards the commander device 20). Conversely, when signal DISABLE is de-asserted the upstream port 326u is connected to the transceiver 324 (e.g., in parallel to the downstream port 326d), so that the daisy-chain is implemented and the responder device 32 communicates with both the downstream and upstream portions of bus 30 (e.g., towards the commander device 20 and towards a subsequent responder device 32) to pass the CAN signals along the bus 30.

In one or more embodiments as exemplified in FIGS. 3 and 5, during an auto-addressing procedure (which may be carried out either at the assembly line or after startup of the bus communication), the switches S1 and S2 of all the responder devices $32_1, 32_2, \ldots, 32_N$ are initially open. Therefore, only the first responder device $32_1$ in the chain can be accessed by the commander device 20 (e.g., CAN FD Light commander) and its individual address can be programmed (e.g., stored in a local memory of device $32_1$). Once programming of the address of the first responder device $32_1$ is completed, the switches S1 and S2 of the first responder device $32_1$ are closed (e.g., by de-asserting signal DISABLE of the first responder device $32_1$) and the next responder device $32_2$ can be accessed by the commander device 20, and its address programmed. The auto-addressing procedure is carried out until all responder devices 32 in the chain have been programmed with their individual addresses.

In the architecture of FIGS. 3 and 5, during operation each wire (CANH and CANL) of the daisy-chained bus 30 includes as many switches connected in series as there are responder devices in the chain. This could lead to an increased series resistance of the differential bus wires (CANH and CANL) that, in conjunction with the capacitance of the bus, might lead to an increased latency. Additionally, symmetry, low resistance and low capacitance of the bus are aimed at, since a CAN FD Light bus can run at a data rate of up to 1000 kb/s (and potentially even higher) and uses a differential line with termination resistors. The differential line should be well balanced and the bus should be well terminated to avoid electromagnetic emissions and to improve electromagnetic immunity as well as reflections on the bus. Therefore, switches S1 and S2 may be advantageously designed so as to have the lowest resistance possible. For instance, switches S1 and S2 may be implemented using MOS transistors with very low impedance and very good matching to keep the resistance difference between wires CANH and CANL symmetrical. In case a low resistance and a good matching of switches S1 and S2 is obtained, one or more embodiments as exemplified in FIGS. 3 and 5 provide an inexpensive way to disconnect the upstream port from the downstream port and thus "partition" the daisy-chained differential bus 30 during the auto-addressing procedure.

Figure 6A:
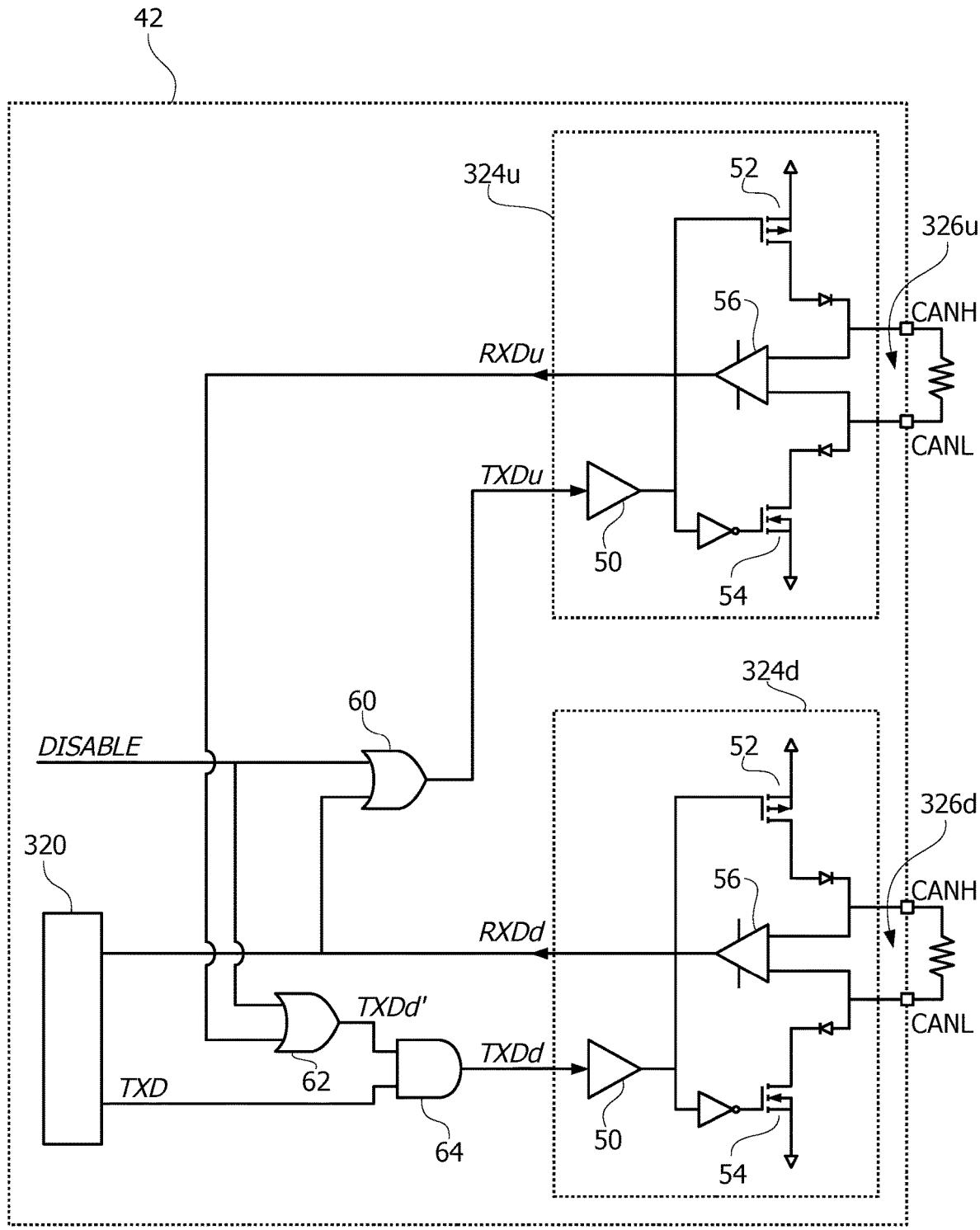
FIGS. 6A, 6B and 6C are circuit block diagrams exemplary of architectures of responder devices according to embodiments of the present description, for use in the communication bus of FIG. 4.

As an alternative to the architecture exemplified in FIGS. 3 and 5, one or more embodiments may rely on the architecture previously discussed with reference to FIG. 4, where an auto-addressing procedure may be implemented by responder devices 42 having the architecture exemplified in the circuit diagrams of FIG. 6A, 6B or 6C. In FIG. 6A, it is shown that each responder device 42 (i.e., each responder device of the type including a downstream CAN transceiver 324d coupled to a downstream port 326d and an upstream CAN transceiver 324u coupled to an upstream port 326u) may include a CAN protocol controller (e.g., a CAN FD Light protocol controller) 320 and associated logic circuitry coupled to CAN transceivers 324d and 324u. The internal structure of CAN transceivers 324d and 324u is the same (conventional) as the structure of transceiver 324 discussed with reference to FIG. 5, and each of transceivers 324*d* and 324*u* is coupled to a respective pair of terminals (downstream and upstream, respectively) that provide the ports for coupling to wires CANH and CANL of segments of the differential bus 30. The downstream transceiver 324*d* receives a respective downstream transmission signal TXDd and produces a respective downstream reception signal RXDd. The upstream transceiver 324*u* receives a respective upstream transmission signal TXDu and produces a respective upstream reception signal RXDu. A first OR logic gate 60 receives input signals DISABLE and RXDd and produces the upstream transmission signal TXDu. A second OR logic gate 62 receives input signals DISABLE and RXDu and produces an intermediate downstream transmission signal TXDd'. An AND logic gate 64 receives input signals TXDd' and TXD (the latter being the transmission signal produced by the protocol controller 320) and produces the downstream transmission signal TXDd. Therefore, when signal DISABLE is asserted (e.g., DISABLE='1'), the transmitter 50 of the upstream transceiver 324*u* is set to recessive level because the upstream transmission signal TXDu is asserted (e.g., TXDu='1'), and the transmitter of the downstream transceiver 324*d* operates as directed by the protocol controller 320 because the downstream transmission signal TXDd is equal to the controller transmission signal TXD (insofar as DISABLE='1' entails TXDd'='1' and thus the AND gate 64 being transparent for signal TXD). In other words, when signal DISABLE is asserted the upstream port 326*u* is disconnected from the downstream port 326*d* and from the protocol controller 320. Since the CAN FD Light responder devices only answer on request from the commander and no request has reached them, the upstream responder devices will always send a recessive signal (logic '1') as it is defined for bus idle (as defined in specification ISO 11898-1). In other words, when signal DISABLE is asserted, TXDu='1' (i.e., the upstream portion of the bus 30 is set to a recessive level) and TXDd=TXD (i.e., the responder device 42 can transmit only downstream towards the commander device). Conversely, when signal DISABLE is de-asserted, TXDu=RXDd (i.e., the signal received from the downstream portion of the bus is propagated to the upstream portion of the bus) and TXDd=(TXD AND RXDu) (i.e., the downstream portion of the bus 30 is set to a dominant level either if commanded by the protocol controller 320 or if a dominant level is received from the upstream portion of the bus 30). It is noted that the OR gate 62 is optional, insofar as it allows to block distortions from the upstream port 326*u* to the downstream port 326*d*, and also allows the implementation of an arbitrating device upstream.

In one or more embodiments, the OR logic gate 62 is optional insofar as signal RXDu may be directly passed to the AND gate 64 together with signal TXD. Provision of gate 62 avoids potential distortions from the upstream bus portion to the downstream bus portion.

In one or more embodiments as exemplified in FIGS. 4 and 6A, during an auto-addressing procedure (which may be carried out either at the assembly line or after startup of the bus communication), the transmitters 50 of the upstream transceivers 324*u* of all the responder devices $42_1$, $42_2$, ..., $42_N$ are initially set to recessive level. Therefore, only the first responder device $42_1$ in the chain can be accessed by the commander device 20 (e.g., CAN FD Light commander) and its individual address can be programmed (e.g., stored in a local memory of device $42_1$). Once programming of the address of the first responder device $42_1$ is completed, the transmitter of the upstream transceiver 324*u* of the first responder device $42_1$ is set to propagate the signal RXDd received from the downstream transceiver 324*d* so that the next responder device $42_2$ can be accessed, and its address programmed. The auto-addressing procedure is carried out until all responder devices 42 in the chain have been programmed with their individual addresses.

Figure 7:
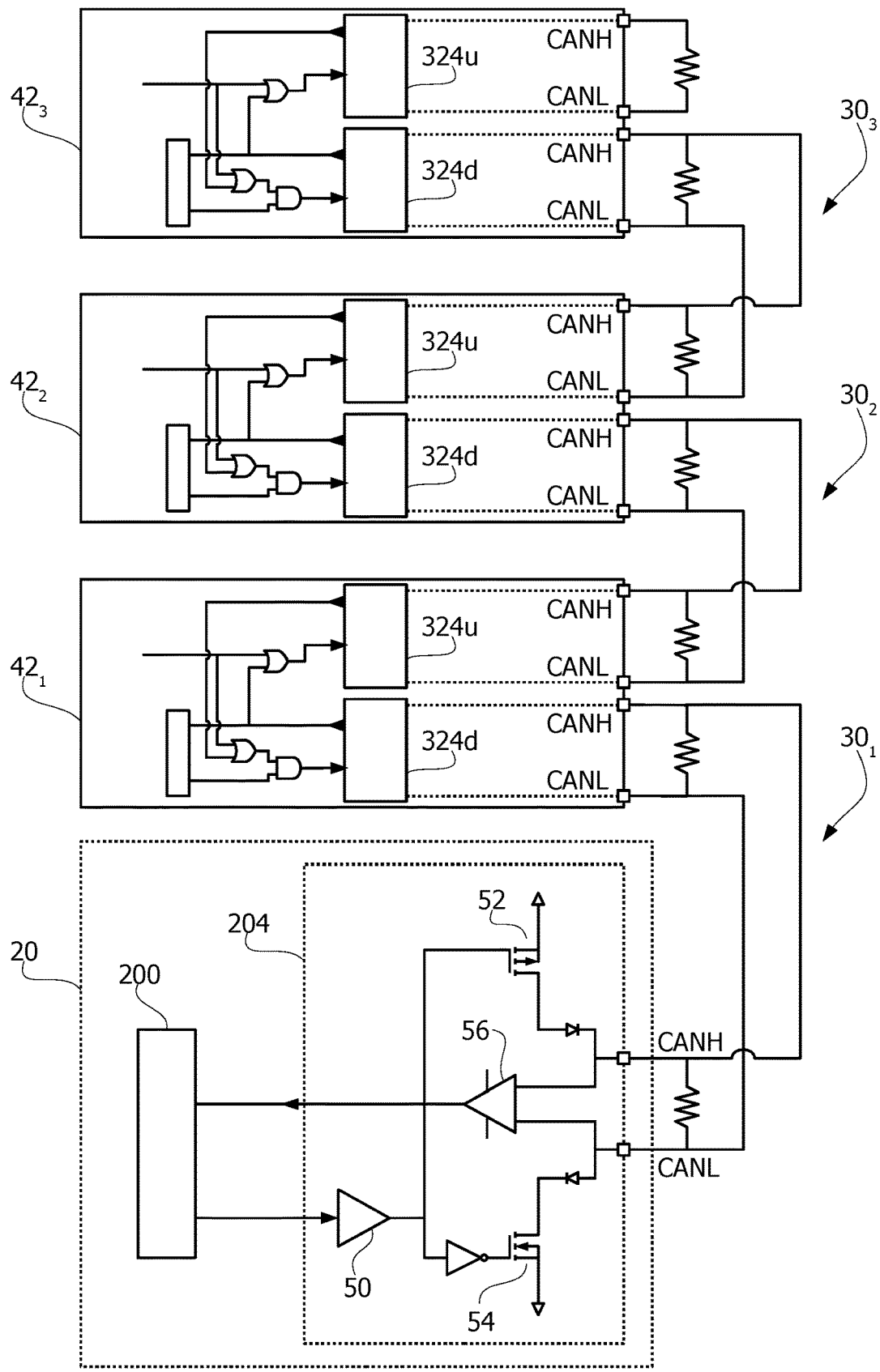
FIG. 7 is a circuit diagram exemplary of another daisy-chain communication bus that operates according to a CAN protocol, such as a CAN FD Light protocol, according to one or more embodiments of the present description.

In the architecture of FIGS. 4 and 6A, during operation the wires (CANH and CANL) of the daisy-chained differential bus 30 are not loaded by an additional series resistance as in the architecture of FIGS. 3 and 5, and each segment of the daisy-chained bus can be terminated individually as exemplified in FIG. 6A (where a termination resistor is coupled between the terminals CANH and CANL of each port), which leads to a good termination that reduces wire reflections, electro-magnetic emissions and sensitivity. FIG. 7 is a circuit block diagram exemplary of a communication bus according to the architecture of FIGS. 4 and 6A, including a commander device 20 and a plurality of responder devices $42_1$, $42_2$, $42_3$ each including a pair of CAN transceivers (i.e., a downstream transceiver 324*d* and an upstream transceiver 324*u*) and respective ports coupled to bus segments $30_1$, $30_2$, $30_3$. Each bus segment is terminated at both ends by respective termination resistors.

It is noted that a daisy-chain topology as adopted by one or more embodiments (see again FIGS. 3 to 7) may add latency to the data being sent over the bus 30. Each segment of the bus may add a little delay to the propagation of signals in the bus. As described in the specification CiA 604-1, the CAN FD Light protocol is based on a commander-responder architecture: the commander device sends a request via the bus to one responder device (which may be the last one in the chain) and waits for an answer from the responder device. Since only one responder device is addressed by the commander device and only one responder device answers, the communication works and there is no limitation on the response latency. However, the maximum possible busload may be reduced.

It is also noted that a conventional CAN FD protocol controller 200 as possibly implemented in the commander device 20 expects feedback in the form of a dominant acknowledge bit (ACK-bit) from at least one responder device after transmission of a frame via the bus 30. It is sufficient that only one (e.g., the first) responder device in the daisy-chain sends such a dominant ACK-bit. Therefore, the additional latency of the upstream responder devices does not have an impact on the ACK-signal, which has to be received within the acknowledge slot of the transmitter device (e.g., of the commander device 20).

In some embodiments, the dominant ACK-bit response is by default initially turned off for all the responder devices, and it is activated by the auto-addressing procedure only for the first responder device in the daisy-chain, which is directly coupled to the commander device 20. The other responder devices may be configured such that they do not send the dominant ACK-bit (e.g., their ACK-bit response functionality may remain turned off).

Figure 6B:
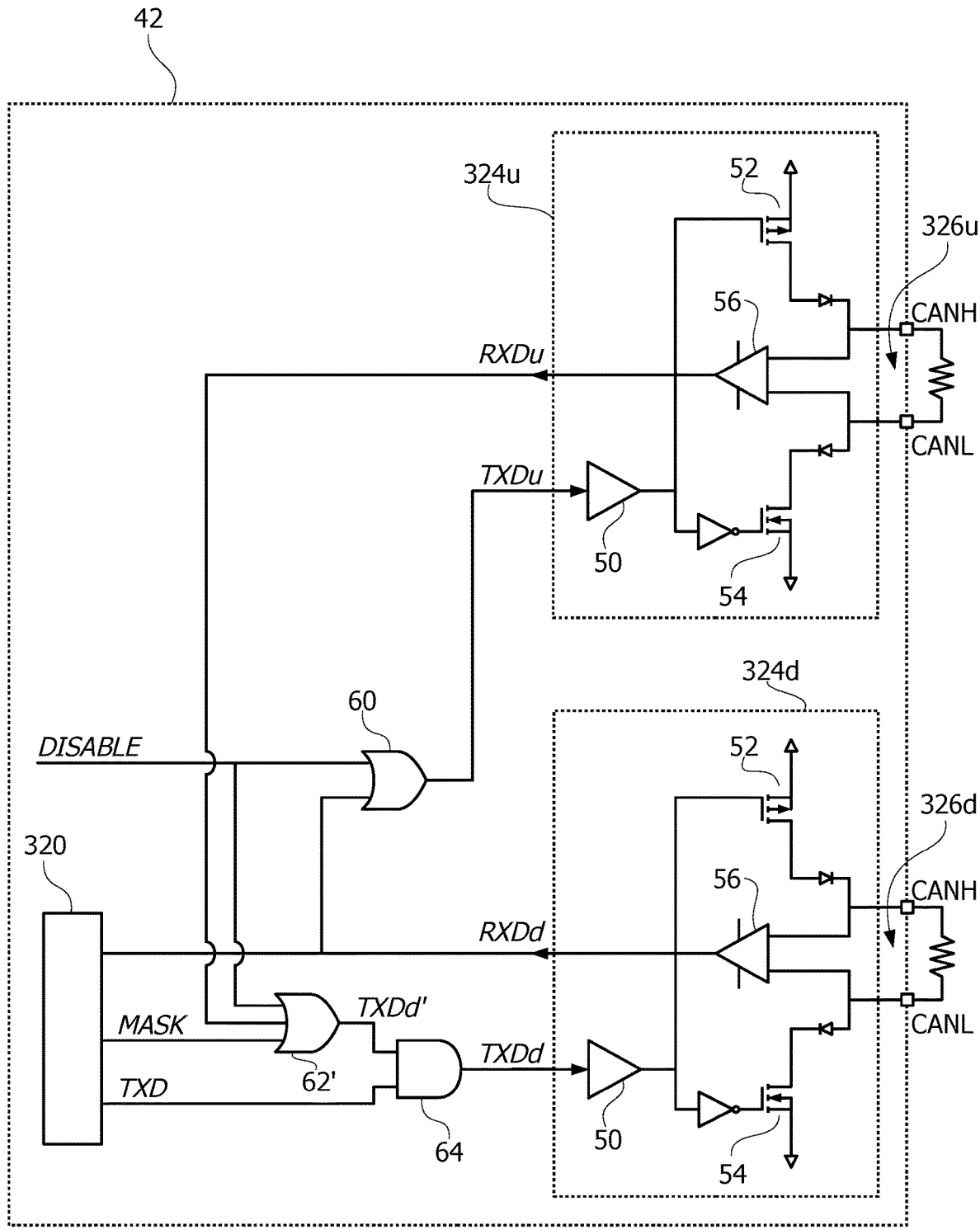

In other embodiments as exemplified in FIG. 6B, a single ACK-bit response may be received by the commander device 20 even if the ACK-bit functionality of more than one responder device is turned on. In this case, the OR gate 62 may be used by the protocol controller 320 to set the stream from the upstream port 326*u* to recessive (e.g., "masking" the stream received at the upstream port 326*u*) from the moment when the device sends its own ACK-bit until at least the end of the ACK delimiter bit (e.g., a total duration equal to three bit times, or even more in case of a longer delay of the daisy chain), thereby avoiding distortions caused by the ACK delay from the upstream devices. This is exemplified in FIG. 6B, where a three-input OR gate 62' is used in place of the two-input OR gate 62 (compare to FIG. 6A), and the three-input OR gate 62' receives from the protocol controller 320 an additional input signal MASK. Signal MASK is asserted (e.g., MASK='1') by the protocol controller 320 from the moment when the responder device 42 sends its ACK-bit until at least the end of the ACK delimiter bit. When the masking signal MASK is asserted, the stream from the upstream port 326u to the downstream port 326d (e.g., signal TXDd') is always set to '1' and therefore masked (e.g., TXDd=TXD). Alternatively, the same masking effect may be achieved by asserting signal DISABLE for masking, insofar as the signals to the upstream port can be recessive during the masking. As previously noted, input of signal DISABLE to gate 62' is optional.

It is noted that in one or more embodiments as exemplified in FIGS. 6A and 6B, the protocol controller 320 of a responder device 42 is never connected to the upstream port 326u (e.g., even when the upstream port 326u is enabled by setting DISABLE='0', this port can only exchange signals with the downstream port 326d, but not with the protocol controller 320). In other words, in such embodiments a responder device 42 may only pass data from the downstream port 326d to the upstream port 326u (and vice versa) and send data produced by the protocol controller 320 downstream, but cannot send data produced by the protocol controller 320 upstream. This is coherent with the current specification of the CAN FD Light protocol, which does not support responder-responder communication. However, upcoming applications may also allow responder-responder communication in a CAN FD Light network. In order to allow responder-responder communication (e.g., to allow a responder device to produce internally a CAN frame and transmit it upstream), embodiments as exemplified in FIG. 6C may be used. FIG. 6C is a circuit block diagram exemplary of an alternative responder device 42 that differs from the embodiments exemplified in FIGS. 6A and 6B in that it further comprises a second AND logic gate 66 that receives input signals TXD (i.e., the CAN transmission signal produced by the protocol controller 320) and RXDd (i.e., the downstream CAN reception signal produced by the downstream CAN transceiver 324d) to produce an intermediate upstream transmission signal TXDu'. The OR logic gate 60 receives input signals DISABLE and TXDu' to produce the upstream CAN transmission signal TXDu. Therefore, the AND logic gate 66 allows the protocol controller 320 to produce frames and send them upstream. In particular, if TXD='0' a dominant bit is sent upstream provided that the upstream port is enabled (i.e., TXD='0' implies TXDu'='0', and thus TXDu='0' when DISABLE='0'). If RXDd='0', a dominant bit is forwarded upstream provided that the upstream port is enabled (i.e., RXDd='0' implies TXDu'='0', and thus TXDu='0' when DISABLE='0'). Note again that logic gate 62 is optional, insofar as signal RXDu may be directly passed to the AND logic gate 64.

Figure 8:
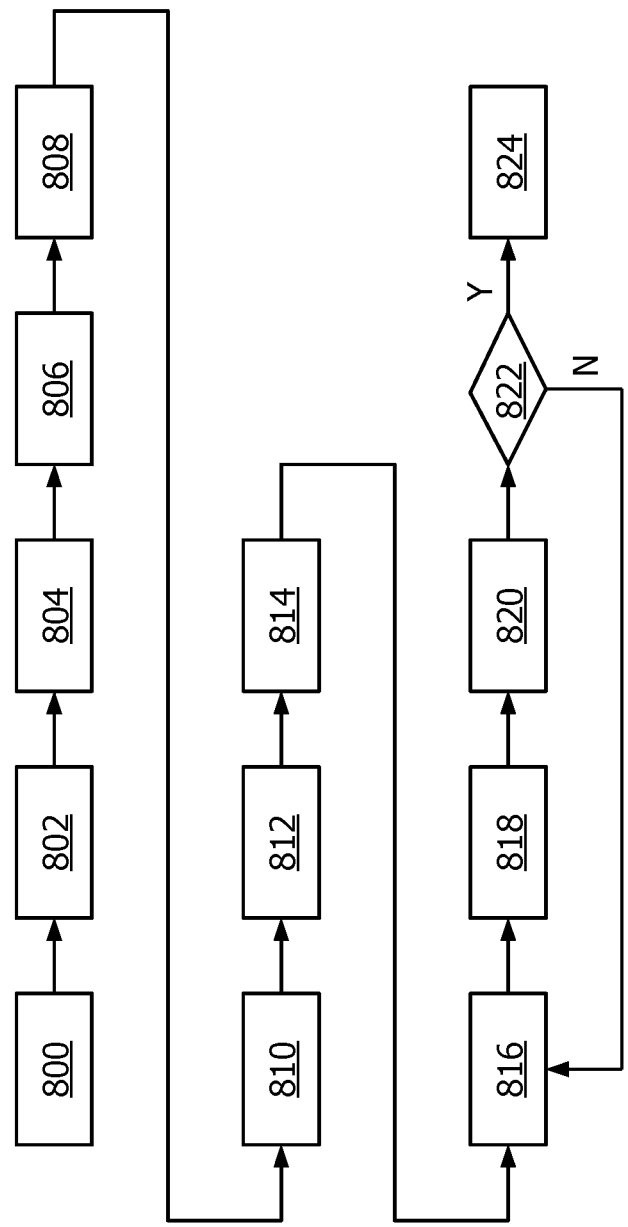
FIG. 8 is a flow diagram exemplary of steps of an auto-addressing procedure according to one or more embodiments of the present description.

One or more embodiments may thus relate to an auto-addressing procedure as exemplified in the flow diagram of FIG. 8 including steps 800 to 824. Before the auto-addressing procedure (step 800), all the responder devices (32 or 42) in the daisy-chain bus 30 are assigned the same device address (e.g., default address). With such an initial address, they can be accessed once they are visible to the commander device 20. Communication between the downstream port 326d and the upstream port 326u of each responder device 32 or 42 is disabled (e.g., by opening switches S1 and S2, or by setting to a recessive level the upstream transmission signal TXDu of each responder device). Therefore, only the first responder device $32_1$ or $42_1$ in the chain is visible to the commander device 20. The ACK-bit response is turned off by default for all responder devices, to avoid any ACK-bit distortions from further upstream devices with a longer latency. Therefore, the commander device may not receive an ACK-bit after having sent a frame, which may lead to errors and error frames. Therefore, the ACK-bit response of the first responder device $32_1$ or $42_1$ is turned on with the first frame transmitted by the commander device 20 (step 802). At this stage, the first responder device $32_1$ or $42_1$ is the only device accessible via the default address. Since the ACK-bit response of the first responder device $32_1$ or $42_1$ is turned on with the first frame sent by the commander device, no ACK-bit response will be generated for the very first frame sent by the commander device, and the missing ACK-bit response may generate an error at the commander device. The commander device may then re-send the same command to the first responder device $32_1$ or $42_1$, and will then receive the expected ACK-bit (step 804). Optionally, in case the first frame did not successfully enable the ACK-bit of the first responder device $32_1$ or $42_1$, an ACK error may be detected again and further frames to enable the ACK-bit may be sent by the commander device 20 (step 806). It is noted that sending and receiving ACK bits is not a requirement of the CAN FD Light protocol, but may be needed for the correct operation of a conventional CAN FD protocol controller 200 as may be embedded in the commander device 20. In case the commander device 20 does not require the reception of the ACK-bit (e.g., because it incorporates a modified or custom CAN FD Light protocol controller), the ACK-bit response feature of the responder devices may be left disabled and steps 802 to 806 may be omitted. Optionally, further frames can be used to read back the values programmed in the first responder device $32_1$ or $42_1$, e.g., a communication with the first responder device may be set up (step 808) even before the address of the first responder device has been re-programmed. In fact, as long as the upstream port 326u of the first responder device $32_1$ or $42_1$ remains disconnected from the downstream portion and the ACK-bit is enabled, the first responder device $32_1$ or $42_1$ is the only one accessible by the commander device 20, so that additional commands can be sent to the first responder device using the default address even before changing the device address to its new (non-default, dedicated) address. At this point, the default address of the first responder device $32_1$ or $42_1$ can be used to modify the device's address to the first address in the chain (e.g., the dedicated address of the first responder device may be programmed). After programming of the dedicated address has been successfully verified by reading back the programmed data from the first responder device, the upstream port 326u of the first responder device $32_1$ or $42_1$ may be enabled to access the second responder device $32_2$ or $42_2$ of the chain (step 810). Once the address of the first responder device $32_1$ or $42_1$ has been changed, communication with this node is always possible even if the upstream port 326u is connected to the bus, since the dedicated address is unique. After the first responder device $32_1$ or $42_1$ has been successfully programmed with its dedicated address and its ACK-bit is enabled, the following nodes along the chain are programmed in the same way, with the difference that the ACK-bit of the following responder devices (from the second one to the last one) may remain disabled to avoid distortions due to the longer latency of the ACK bit sent by further responder devices. In particular, the commander device 20 may read updated configuration data from the first responder device $32_1$ or $42_1$ (step 812), and may set up a communication with the first responder device $32_1$ or $42_1$ and the second responder device $32_2$ or $42_2$ (step 814) even before the address of the second responder device $32_2$ or $42_2$ has been re-programmed. In fact, as long as the upstream port 326u of the second responder device $32_2$ or $42_2$ remains disconnected from the downstream portion, the second responder device $32_2$ or $42_2$ is the only one accessible by the commander device 20 with the default address (because the first responder device has already been re-programmed), so that additional commands can be sent to the second responder device using the default address even before changing the device address to its new (non-default, dedicated) address. Exchange of optional commands between the commander device 20 and the reachable responder devices is thus always possible, either using the default address to reach the last responder device currently connected to the bus (if the respective upstream port 326u is disconnected) or the newly programmed address once it has been modified. At this point, the default address of the second responder device $32_2$ or $42_2$ can be used to modify the device's address to the second address in the chain (e.g., the dedicated address of the second responder device may be programmed). After programming of the dedicated address has been successfully verified by reading back the programmed data from the second responder device, the upstream port 326u of the second responder device $32_2$ or $42_2$ can be enabled to access the next (e.g., third) responder device $32_3$ or $42_3$ of the chain (step 816). The commander may then optionally read updated configuration data from the newly programmed responder device (step 818) and optionally set up a communication with all the responder devices currently accessible in the chain (step 820). At a step 822, the auto-addressing procedure includes checking whether all the responder devices have been programmed. In the case of a negative (N) outcome, the procedure repeats steps 816 to 820 to program the next responder device. In the case of an affirmative (Y) outcome, the auto-addressing procedure terminates (step 824). The end of the auto-addressing procedure (i.e., the affirmative outcome of check 822) can be detected, for instance, by counting the devices in the chain if their number is known, or if no device is accessible with the default address anymore. The latter option relies on the fact that after the upstream port is enabled, a response of the next responder device accessed using the default command is requested. If no response is received, no responder device is left to be programmed and the auto-addressing procedure is completed.

Figure 9:
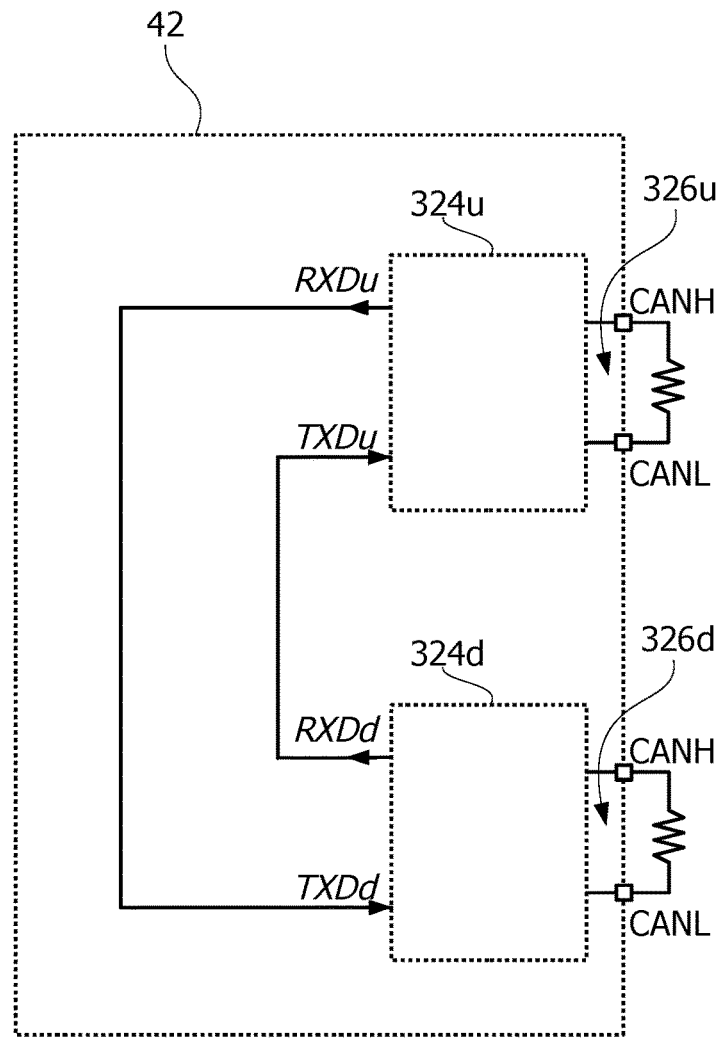
FIG. 9 is a circuit block diagram exemplary of possible signal connections in a responder device according to embodiments of the present description, for use in the communication bus of FIG. 4.

Making now reference to FIG. 9, which is a circuit block diagram exemplary of a responder device 42 where the internal components of transceivers 324u and 324d are not illustrated for the sake of ease of illustration, it is noted that, in one or more embodiments that comprise a pair of CAN transceivers 324u and 324d, a simple connection between the receiver of transceiver 324d and the transmitter of transceiver 324u (i.e., between signals RXDd and TXDu) and a simple connection between the receiver of transceiver 324u and the transmitter of transceiver 324d (i.e., between signals RXDu and TXDd) in order to implement a daisy-chain architecture may be prone to a latching phenomenon. In particular, if a first side of the chain is set to a dominant state (e.g., the downstream port 326d is set to a low logic level), the dominant signal is transferred to the other transceiver (e.g., RXDd='0'–>TXDu='0'), which thus drives the other side of the chain to a dominant state as well (e.g., the upstream port 326u is set to a low logic level as well). The dominant signal at this latter portion of the bus is then read back (e.g., by the upstream transceiver 324u) to the first side of the chain (e.g., RXDu='0'–>TXDd='0') where the transceiver holds the bus in a dominant state. Therefore, a loop may form, and the bus may be stuck in the dominant state.

Therefore, one or more embodiments that rely on the implementation of a pair of CAN transceivers 324d, 324u may additionally include a logic circuit configured to interrupt the feedback path between the two transceivers 324d, 324u when a dominant state is sensed at any of the two ports 326d, 326u. Such a logic circuit may operate according to the state diagram exemplified in FIG. 10. Substantially, as long as the receivers 56 of both the downstream transceiver 324d and the upstream transceiver 324u detect a recessive signal at the respective bus portion (state S1 of FIG. 10), both the transmitters 50 are "open", that is, they forward the signal received from the other transceiver to their portion of the bus (e.g., transmitter 50 of downstream transceiver 324d passes signal RXDu and transmitter 50 of upstream transceiver 324u passes signal RXDd), which are both recessive. As soon as one of the receivers 56 detects a dominant signal at its respective bus portion, it blocks its own transmitter by setting it to a recessive state and leaves the other transmitter open to send the dominant signal to its bus. Thus, if the upstream receiver 56 detects a dominant signal at port 326u (trigger C1 in FIG. 10), the state machine moves to state S2 where the upstream transmitter 50 is blocked into a recessive state (which however does not affect the dominant value at port 326u) and the downstream transmitter 50 is open (e.g., it propagates signal RXDu to the downstream port 326d). Similarly, if the downstream receiver 56 detects a dominant signal at port 326d (trigger C2 in FIG. 10), the state machine moves to state S3 where the downstream transmitter 50 is blocked into a recessive state (which however does not affect the dominant value at port 326d) and the upstream transmitter 50 is open (e.g., it propagates signal RXDd to the upstream port 326u). State S2 or S3 is kept until both receivers 56 detect again a recessive signal (triggers C3 and C4 in FIG. 10): then both transmitters 50 are opened again (e.g., the state machine moves back to state S1).

So, whichever receiver detects a dominant signal first blocks its transmitter until both receivers detect a recessive value on the bus again. This avoids that a dominant signal being forwarded from one port to the other port is sent back to its origin port, which avoids the feedback loop and the latch. Such a control mechanism can be used in CAN FD Light (and other commander/responder based bus systems such as LIN) because the communication goes always in one direction.

Figure 10:
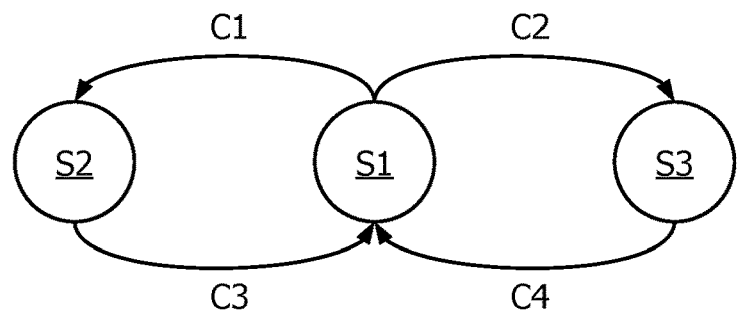
FIG. 10 is a state diagram exemplary of operation of a control circuit for use in a responder device according to embodiments of the present description, for use in the communication bus of FIG. 4.
Figure 11:
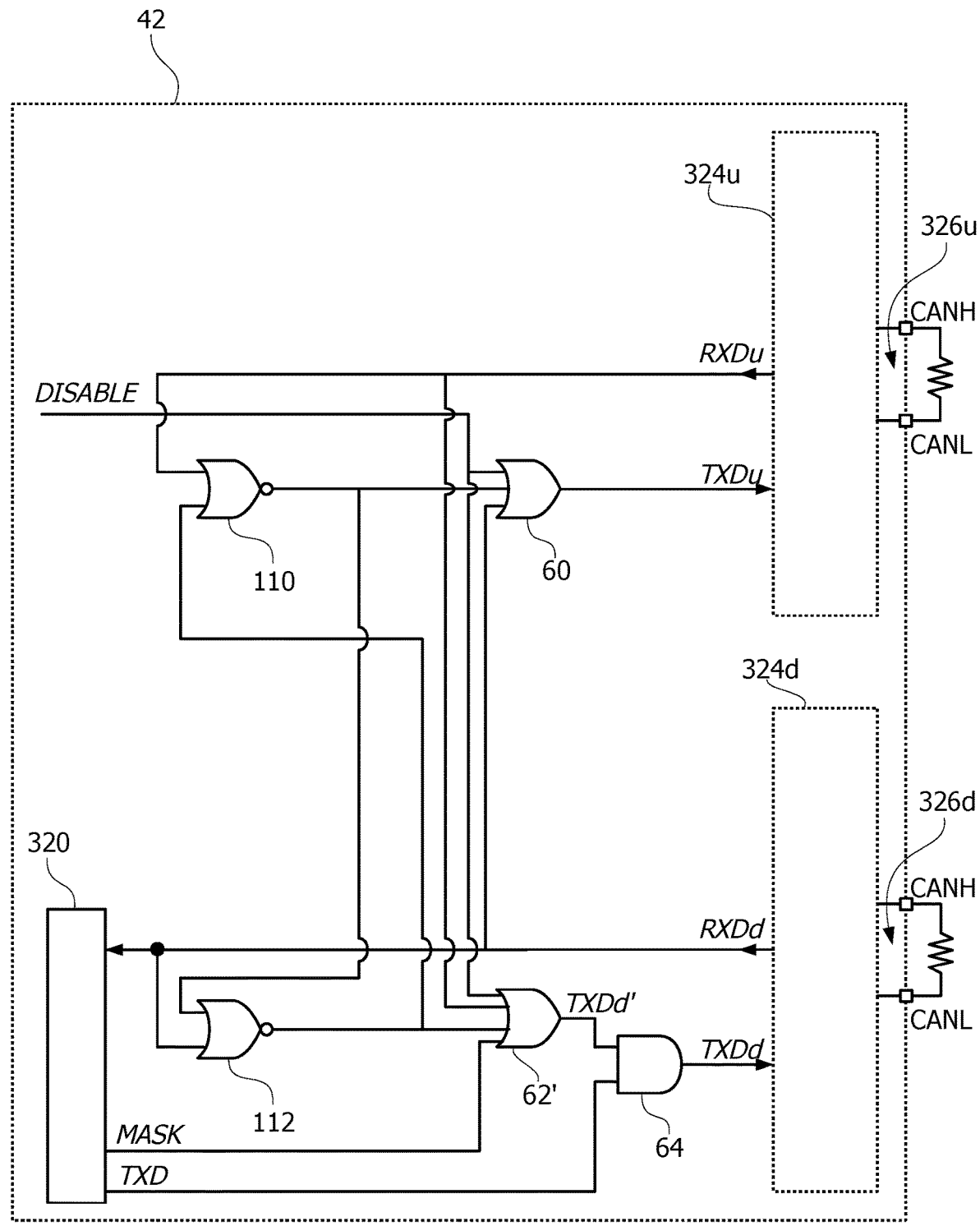
FIGS. 11 to 14 are circuit block diagrams exemplary of architectures of responder devices according to embodiments of the present description, for use in the communication bus of FIG. 4, including various embodiments of a control circuit that implements the state diagram of FIG. 10.

FIG. 11 is a circuit block diagram exemplary of a two-transceiver responder device 42 that includes a logic circuit that implements the state diagram of FIG. 10. In addition to the embodiment of FIG. 6B, the responder device 42 of FIG. 11 includes a set-rest flip-flop (SR FF). The SR flip-flop may be implemented, for instance, by a first NOR logic gate no and a second NOR logic gate 112. Logic gate no receives signal RXDu at a first input terminal and the output from logic gate 112 at a second input terminal. Logic gate 112 receives signal RXDd at a first input terminal and the output from logic gate 110 at a second input terminal. The OR logic gate 60 is a three-input gate and receives, in addition to signals DISABLE and RXDd, a third input signal that is the output of NOR logic gate 110. The OR logic gate 62' is a four-input gate and receives, in addition to signals DISABLE, RXDu and MASK, a fourth input signal that is the output of NOR logic gate 112. Therefore, logic gates 110 and 112 implement the operation principle discussed with reference to FIG. 10. However, such an implementation may suffer from stability issues, and requires the NOR gates no and 112 to have a propagation delay that is dominant (e.g., higher than the propagation delay of the transmission path from one transceiver to the other transceiver) in order to avoid oscillation.

Figure 12:
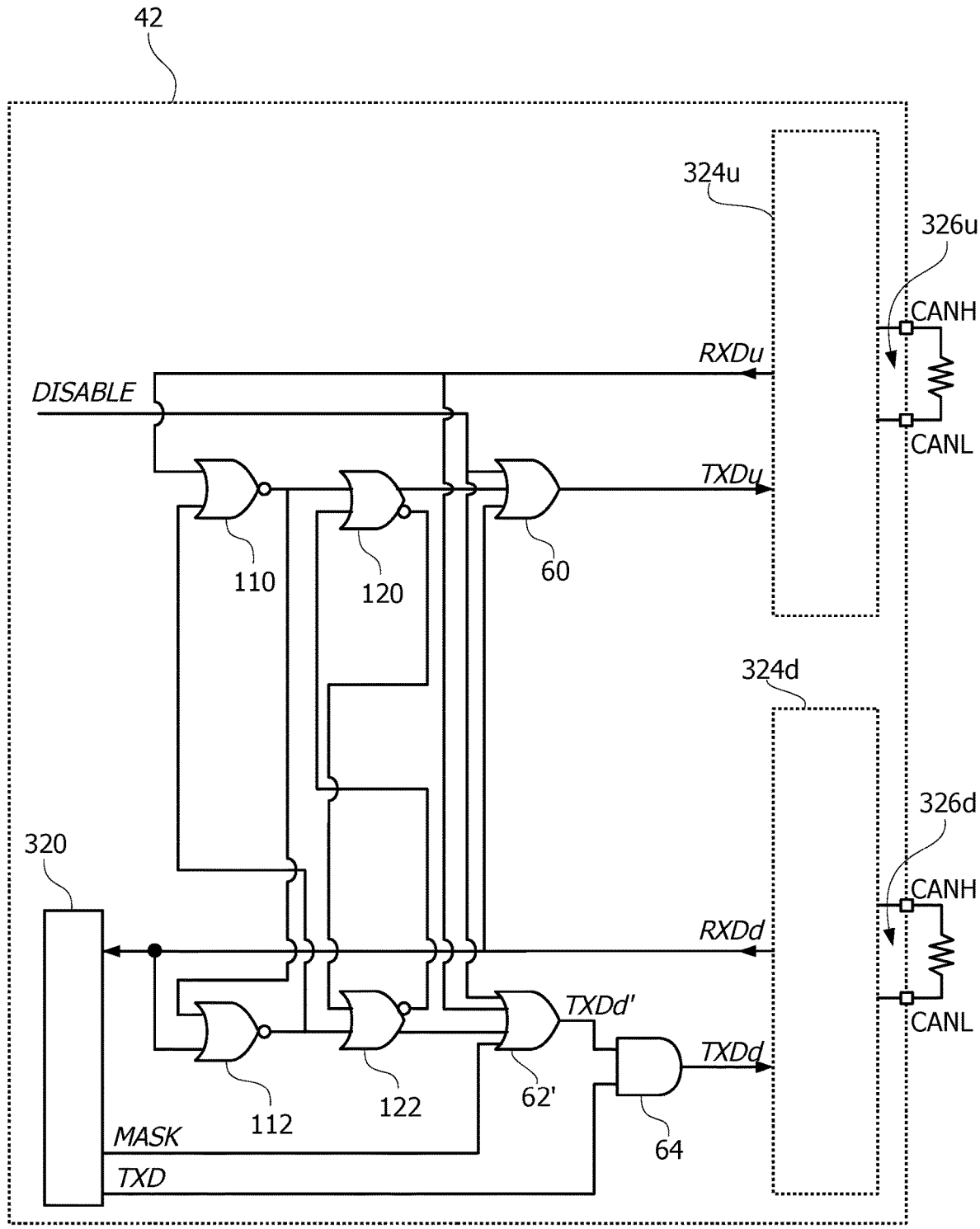

FIG. 12 is a circuit block diagram exemplary of another possible implementation of a logic circuit that implements the state diagram of FIG. 10. Compared to the embodiments of FIG. 11, the responder device 42 of FIG. 12 additionally includes a second set-reset flip-flop (SR FF). The second SR flip-flop may be implemented, for instance, by a first OR/NOR logic gate 120 and a second OR/NOR logic gate 122. Logic gate 120 receives the output from logic gate 110 at a first input terminal and the complemented (NOR) output from logic gate 122 at a second input terminal. Logic gate 122 receives the output from logic gate 112 at a first input terminal and the complemented (NOR) output from logic gate 120 at a second input terminal. The OR logic gate 60 is a three-input gate and receives, in addition to signals DISABLE and RXDd, a third input signal that is the normal (OR) output of logic gate 120. The OR logic gate 62' is a four-input gate and receives, in addition to signals DISABLE, RXDu and MASK, a fourth input signal that is the normal (OR) output of logic gate 122. Therefore, logic gates 110, 112, 120 and 122 implement the operation principle discussed with reference to FIG. 10. Advantageously, such an implementation is stable (e.g., guarantees oscillation-free operation) for any value of the propagation delay of the logic gates 110 and 112.

Figure 13:
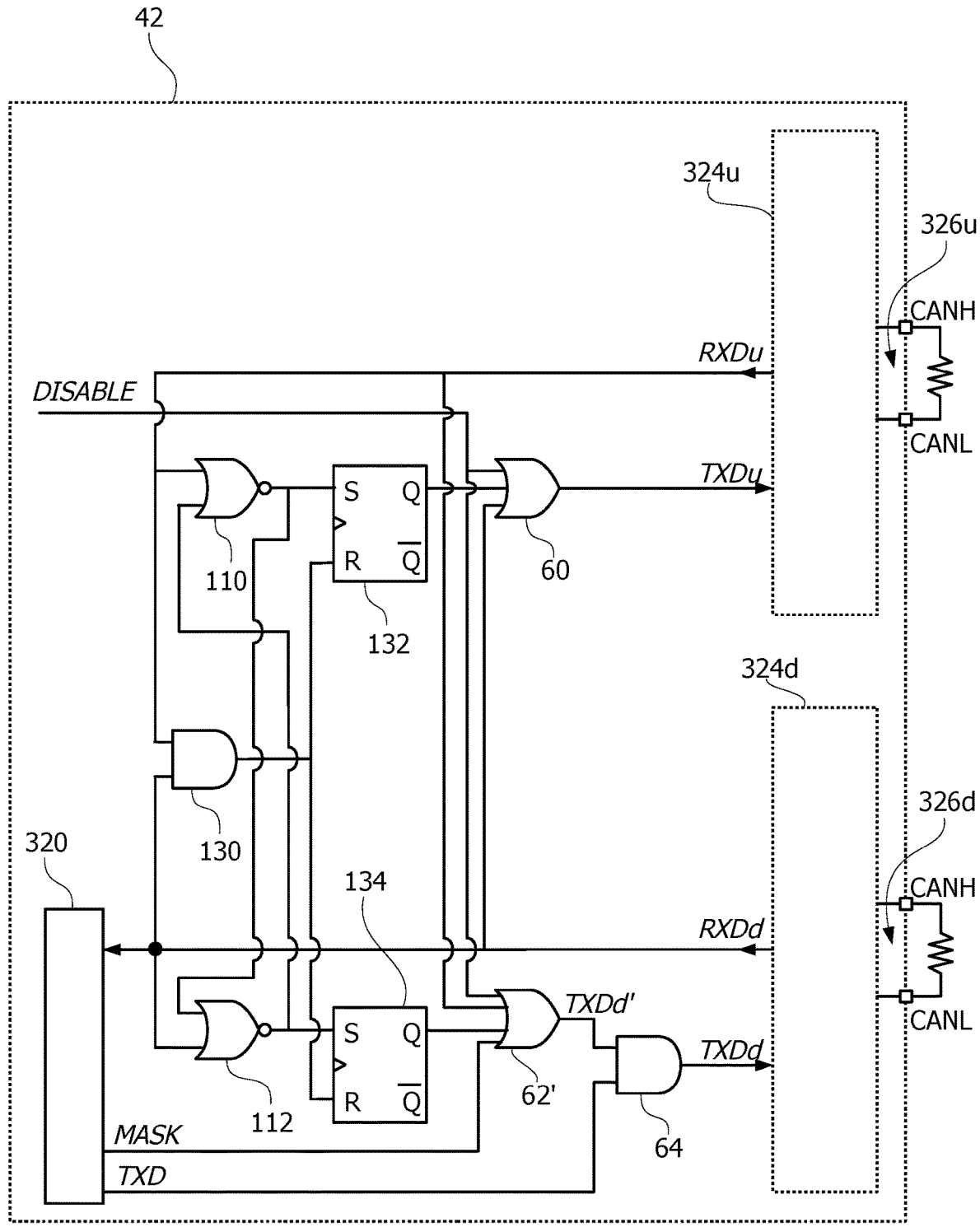

FIG. 13 is a circuit block diagram exemplary of another possible implementation of a logic circuit that implements the state diagram of FIG. 10. Compared to the embodiments of FIG. 11, the responder device 42 of FIG. 12 additionally includes an AND logic gate 130 and a pair of set-reset flip flops 132, 134. The AND logic gate 130 receives signal RXDu at a first input terminal and signal RXDd at a second input terminal. The set-reset flip flop 132 receives the output from NOR logic gate no at a respective set terminal, and the output from AND logic gate 130 at a respective reset terminal. The set-reset flip flop 134 receives the output from NOR logic gate 112 at a respective set terminal, and the output from AND logic gate 130 at a respective reset terminal. The OR logic gate 60 is a three-input gate and receives, in addition to signals DISABLE and RXDd, a third input signal that is the normal (Q) data output of flip-flop 132. The OR logic gate 62' is a four-input gate and receives, in addition to signals DISABLE, RXDu and MASK, a fourth input signal that is the normal (Q) data output of flip-flop 134. Therefore, logic gates 110, 112, 130 and flip-flops 132 and 134 implement the operation principle discussed with reference to FIG. 10. Advantageously, such an implementation is stable (e.g., guarantees oscillation-free operation) for any value of the propagation delay of the logic gates 110 and 112.

Figure 14:
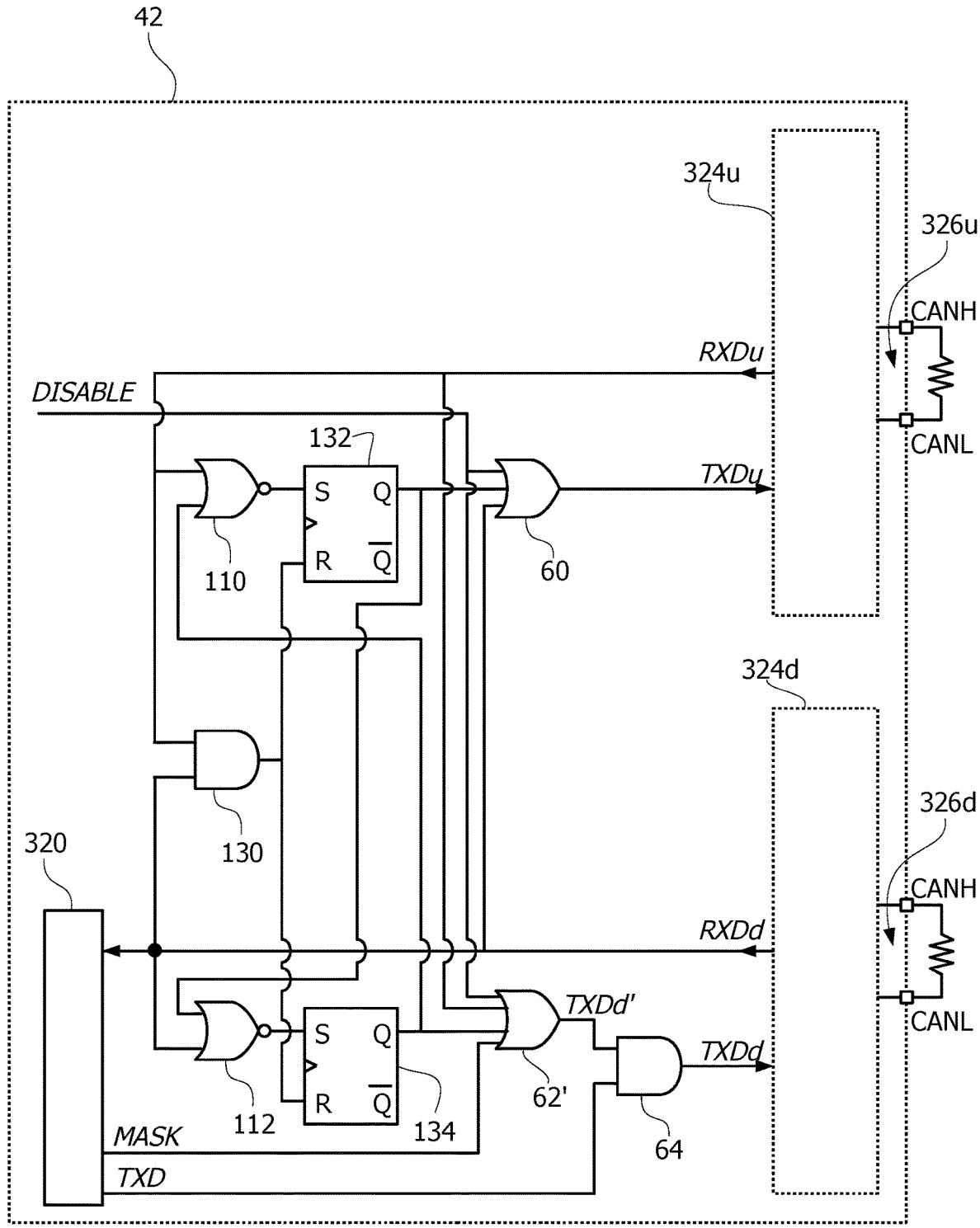

FIG. 14 is a circuit block diagram exemplary of another possible implementation of a logic circuit that implements the state diagram of FIG. 10. Compared to the embodiments of FIG. 13, the logic gate 110 receives the normal (Q) data output from flip-flop 134 at its second input terminal (instead of receiving the output from logic gate 112), and the logic gate 112 receives the normal (Q) data output from flip-flop 132 at its second input terminal (instead of receiving the output from logic gate 110). Therefore, logic gates 110, 112, 130 and flip-flops 132 and 134 implement the operation principle discussed with reference to FIG. 10. Advantageously, such an implementation is stable (e.g., guarantees oscillation-free operation) for any value of the propagation delay of the logic gates 110 and 112.

By way of example, operation of a circuit as exemplified in FIG. 14 is described in detail in the following. As long as both receivers are recessive (e.g., RXDu='1' and RXDd='1'), the flip-flop 132 and 134 are both in the reset state (both the "set" signals are equal to '0'). In the reset state, the normal (Q) data output is equal to '0', which allows the receive signal from one side to be transmitted to the transmit signal of the other side (e.g., RXDu transmitted to TXDd and RXDd transmitted to TXDu) because the OR logic gates 60 and 62' are transparent (provided that DISABLE='0'). As soon as one receiver detects a '0' value (dominant state) on the respective portion of the bus, the reset signal is removed and the flip-flops 132 and 134 hold their states. The flip-flop whose set-input (S) is connected, via NOR gate 110 or 112, to the receiver that detected the dominant state is then set, because the set-input of such a flip-flop is now equal to '1'. In this case, the respective data output (Q) goes to '1', thereby forcing the associated transmission signal (TXDu or TXDd') to '1' (recessive state) via the respective OR logic gate (60 or 62'). The other flip-flop instead keeps its state, and its data output (Q) stays equal to '0' leaving the respective OR logic gate (62' or 60) transparent, so that the signal from the other side can be applied to the respective portion of the bus via the transmitter. This state is kept until both receivers detect a recessive signal on their portions of the bus (e.g., both signals RXDu and RXDd are equal to '1'). Then, both flip-flops 132 and 134 are reset again and both the transmission signals are transparent to the other stream's receive signals. Such a mechanism ensures that a dominant signal being sent to the other portion of the bus has turned into recessive before opening the loop again. The solution discussed herein is robust against ringing on the dominant to recessive edge where ringing in CAN networks occur, since the recessive level is not actively driven by the transceivers but set by the termination resistors. Although the ringing is transmitted from one bus to the other once both portions of the bus are stable recessive both flip-flops 132 and 134 are reset and the transmitters are open.

It is noted that, in all embodiments according to FIGS. 11 to 14, input of signal DISABLE to the OR logic gate 62' is optional.

Figure 6C:
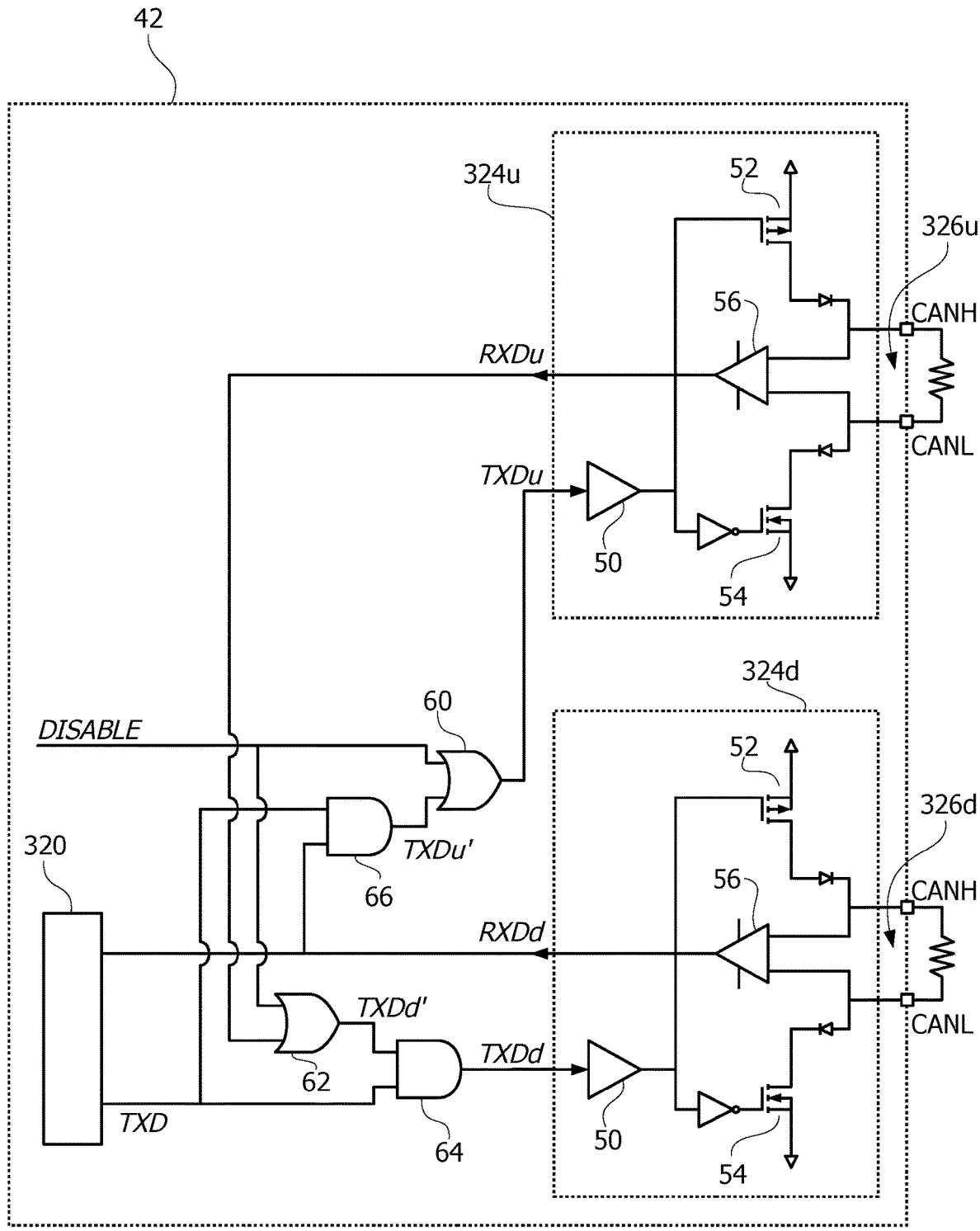

It will be noted that any of the solutions disclosed with reference to FIGS. 11 to 14 may be implemented in one or more embodiments as disclosed with reference to FIGS. 6A to 6C. Operation of the signals TXD, DISABLE, MASK is just the same as previously discussed. Similarly, all embodiments are suitable to implement an auto-addressing procedure as previously discussed, e.g., with reference to FIG. 8.

One or more embodiments may thus provide a daisy-chain communication bus provided with an auto-addressing functionality that is operable at high data rates (e.g., 1000 kbit/s or more) using a CAN protocol (e.g., a CAN FD protocol or a CAN FD Light protocol).

Without prejudice to the underlying principles, the details and embodiments may vary, even significantly, with respect to what has been described by way of example only, without departing from the extent of protection.

What is claimed is:

1. An electronic device, comprising:
a CAN protocol controller;
a first communication port configured to be coupled to a first segment of a differential bus;
a second communication port configured to be coupled to a second segment of the differential bus, wherein the second communication port is enabled in response to a control signal being de-asserted and disabled in response to the control signal being asserted, wherein CAN signals are passed between the first communication port and the second communication port in response to the control signal being de-asserted, and the CAN signals are not passed between the first communication port and the second communication port in response to the control signal being asserted;

a first CAN transceiver circuit coupled to the CAN protocol controller and configured to receive a first CAN transmission signal therefrom and to transmit a first CAN reception signal thereto, the first CAN transceiver circuit being coupled to the first communication port and configured to drive a differential voltage at the first segment of the differential bus based on the first CAN transmission signal and to sense a differential voltage at the first segment of the differential bus and to produce the first CAN reception signal;

a second CAN transceiver circuit coupled to the second communication port and configured to drive a differential voltage at the second segment of the differential bus based on a second CAN transmission signal or to sense a differential voltage at the second segment of the differential bus and to produce a second CAN reception signal;

a first OR logic gate configured to apply OR logic processing to the control signal and the first CAN reception signal produced by the first CAN transceiver circuit and to produce the second CAN transmission signal; and a first AND logic gate configured to apply AND logic processing to the second CAN reception signal produced by the second CAN transceiver circuit and the second CAN transmission signal produced by the CAN protocol controller and to produce the first CAN transmission signal.

2. The electronic device of claim 1, wherein:
in response to the control signal being asserted, the second CAN transceiver circuit is configured to output a recessive level at the second segment of the differential bus, and the first CAN transceiver circuit is configured to drive the differential voltage at the first segment of the differential bus based on the first CAN transmission signal produced by the CAN protocol controller; and
in response to the control signal being de-asserted, the second CAN transceiver circuit is configured to drive the differential voltage at the second segment of the differential bus based on the first CAN reception signal produced by the first CAN transceiver circuit, and the first CAN transceiver circuit is configured to drive the differential voltage at the first segment of the differential bus based on the first CAN transmission signal produced by the CAN protocol controller and the second CAN reception signal produced by the second CAN transceiver circuit.

3. The electronic device of claim 2, comprising a second OR logic gate configured to apply OR logic processing to the control signal and the second CAN reception signal produced by the second CAN transceiver circuit and to produce an intermediate CAN downstream transmission signal, wherein the first AND logic gate is configured to apply AND logic processing to the intermediate CAN downstream transmission signal and the second CAN transmission signal produced by the CAN protocol controller and to produce the first CAN transmission signal.

4. The electronic device of claim 3, wherein:
the CAN protocol controller is configured to transmit an acknowledge signal to the first CAN transceiver circuit in response to a CAN signal being received at the first communication port;
the CAN protocol controller is configured to assert a masking signal during transmission of the acknowledge signal; and
the second OR logic gate is configured to apply OR logic processing to the control signal, the second CAN reception signal produced by the second CAN transceiver circuit, and the masking signal and to produce the intermediate CAN downstream transmission signal.

5. The electronic device of claim 2, comprising a second AND logic gate configured to apply AND logic processing to the first CAN transmission signal produced by the CAN protocol controller and the first CAN reception signal produced by said first CAN transceiver circuit and to produce an intermediate CAN upstream transmission signal, wherein the first OR logic gate is configured to apply OR logic processing to the control signal and the intermediate CAN upstream transmission signal and to produce the second CAN transmission signal.

6. The electronic device of claim 2, comprising a logic circuit configured to:
set the first CAN transmission signal to a recessive level in response to the first CAN reception signal having a dominant level, and
set the second CAN transmission signal to a recessive level in response to the second CAN reception signal having a dominant level.

7. The electronic device of claim 6, wherein the logic circuit comprises a first NOR logic gate and a second NOR logic gate, wherein:
the first NOR logic gate is configured to apply NOR logic processing to the second CAN reception signal and to an output signal from the second NOR logic gate and to produce a first blocking signal;
the second NOR logic gate is configured to apply NOR logic processing to the first CAN reception signal and to an output signal from the first NOR logic gate and to produce a second blocking signal;
the second CAN transmission signal is forced to a recessive level in response to the first blocking signal being asserted; and
the first CAN transmission signal is forced to a recessive level in response to the second blocking signal being asserted.

8. The electronic device of claim 7, wherein the logic circuit further comprises a first OR/NOR logic gate and a second OR/NOR logic gate, wherein:
the first OR/NOR logic gate is configured to apply OR logic processing to the first blocking signal and to a NOR output signal from the second OR/NOR logic gate and to produce a third blocking signal;
the second OR/NOR logic gate is configured to apply OR logic processing to the second blocking signal and to a NOR output signal from the first OR/NOR logic gate and to produce a fourth blocking signal;
the second CAN transmission signal is forced to a recessive level in response to the third blocking signal being asserted; and
the first CAN transmission signal is forced to a recessive level in response to the fourth blocking signal being asserted.

9. The electronic device of claim 7, wherein the logic circuit further comprises:
a second AND logic gate;
a first set-reset flip-flop; and
a second set-reset flip-flop, wherein:
the second AND logic gate is configured to apply AND logic processing to the second CAN reception signal and to the first CAN reception signal and to produce a reset signal;
the first set-reset flip-flop is configured to receive the first blocking signal at a set input terminal and to receive the reset signal at a reset input terminal and to produce a third blocking signal at a data output terminal;
the second set-reset flip-flop is configured to receive the second blocking signal at a set input terminal and to receive the reset signal at a reset input terminal and to produce a fourth blocking signal at a data output terminal;
the second CAN transmission signal is forced to a recessive level in response to the third blocking signal being asserted; and
the first CAN transmission signal is forced to a recessive level in response to the fourth blocking signal being asserted.

10. The electronic device of claim 9, wherein:
the first NOR logic gate is configured to apply NOR logic processing to the second CAN reception signal and to the fourth blocking signal and to produce the first blocking signal; and
the second NOR logic gate is configured to apply NOR logic processing to the first CAN reception signal and to the third blocking signal and to produce the second blocking signal.

11. The electronic device of claim 1, comprising a set of switches arranged between the first communication port and the second communication port and controlled by the control signal, wherein the second communication port is coupled in parallel to the first communication port in response to the control signal being de-asserted, and is decoupled from the first communication port in response to the control signal being asserted.

12. The electronic device of claim 11, wherein the first CAN transceiver circuit is coupled to the second communication port in response to the control signal being de-asserted and to drive the differential voltage at the second segment of the differential bus based on the first CAN transmission signal and to sense the differential voltage at the second segment of said differential bus and to produce the first CAN reception signal.

13. The electronic device of claim 1, wherein the CAN protocol controller is configured to encode frames according to a CAN protocol, or to decode frames received from the differential bus according to the CAN protocol.

14. A differential bus communication system, comprising:
a commander device, the commander device comprising a CAN protocol controller, a CAN transceiver circuit coupled to the CAN protocol controller, and a communication port coupled to the CAN transceiver circuit and connected to a first end of a first segment of a differential bus;
a first responder device and a second responder device, each of the first and second responder devices respectively including:
a CAN protocol controller;
a first communication port being connected to the first segment of the differential bus;
a second communication port being connected to a second segment of the differential bus;
a first CAN transceiver circuit coupled to the CAN protocol controller and configured to receive a first CAN transmission signal therefrom and to transmit a first CAN reception signal thereto, the first CAN transceiver circuit being coupled to the first communication port and configured to drive a differential voltage at the differential bus based on the first CAN transmission signal and to sense a differential voltage at the differential bus and to produce the first CAN reception signal;
a second CAN transceiver circuit coupled to the second communication port and configured to drive a differential voltage at the second segment of the differential bus based on a second CAN transmission signal or to sense a differential voltage at the second segment of the differential bus and to produce a second CAN reception signal;
a logic circuit comprising a first NOR logic gate and a second NOR logic gate, the logic circuit being configured to set the first CAN transmission signal to a recessive level in response to the first CAN reception signal having a dominant level, and set the second CAN transmission signal to a recessive level in response to the second CAN reception signal having a dominant level, the first NOR logic gate being configured to apply NOR logic processing to the second CAN reception signal and to an output signal from the second NOR logic gate and to produce a first blocking signal, and the second NOR logic gate being configured to apply NOR logic processing to the first CAN reception signal and to an output signal from the first NOR logic gate and to produce a second blocking signal; and
wherein the second communication port is enabled in response to a control signal being de-asserted and disabled in response to the control signal being asserted, wherein CAN signals are passed between the first communication port and the second communication port in response to the control signal being de-asserted, and the CAN signals are not passed between the first communication port and the second communication port in response to the control signal being asserted,
and
wherein the first communication port of the second responder device is connected to the second segment of the differential bus, and the second communication port of the second responder device is connected to a third segment of the differential bus.

15. The differential bus communication system of claim 14, comprising a termination resistor coupled in parallel to the communication port of the commander device, the first or second communication ports of the first responder device, and the first or second communication ports of the second responder device.

16. A method of configuring a differential bus communication system, the differential bus communication system including:
a commander device, the commander device comprising a CAN protocol controller, a CAN transceiver circuit coupled to the CAN protocol controller, and a communication port coupled to the CAN transceiver circuit and connected to a first end of a first segment of a differential bus;

a first responder device and a second responder device, each of the first and second responder devices respectively including:
a CAN protocol controller;
a first communication port being connected to the first segment of the differential bus;
a second communication port being connected to a second segment of the differential bus, the second communication port being enabled in response to a control signal being de-asserted and disabled in response to the control signal being asserted;
a first CAN transceiver circuit coupled to the CAN protocol controller and configured to receive a first CAN transmission signal therefrom and to transmit a first CAN reception signal thereto, the first CAN transceiver circuit being coupled to the first communication port and configured to drive a differential voltage at the differential bus based on the first CAN transmission signal and to sense a differential voltage at the differential bus and to produce the first CAN reception signal;
a second CAN transceiver circuit coupled to the second communication port and configured to drive a differential voltage at the second segment of the differential bus based on a second CAN transmission signal or to sense a differential voltage at the second segment of the differential bus and to produce a second CAN reception signal;
an OR logic gate configured to apply OR logic processing to the control signal and the first CAN reception signal produced by the first CAN transceiver circuit and to produce the second CAN transmission signal;
wherein CAN signals are passed between the first communication port and the second communication port in response to the control signal being de-asserted, and the CAN signals are not passed between the first communication port and the second communication port in response to the control signal being asserted,
and
wherein the first communication port of the second responder device is connected to the second segment of the differential bus, and the second communication port of the second responder device is connected to a third segment of the differential bus, the method comprising:
sending, from the commander device to the first responder device via the first segment of the differential bus using a default bus address, a first configuration frame including instructions for setting a univocal bus address for the first responder device;
receiving the first configuration frame at the first responder device and storing the univocal bus address for the first responder device in a memory area of the first responder device;
enabling the second communication port of the first responder device by de-asserting the control signal of the first responder device;
sending, from the commander device to the second responder device via the first segment and the second segment of the differential bus using a default bus address, a second configuration frame including instructions for setting a univocal bus address for the second responder device;
receiving the second configuration frame at the second responder device and storing the univocal bus address for the second responder device in a memory area of the second responder device; and
enabling the second communication port of the second responder device by de-asserting the control signal of the second responder device.

17. The method of claim 16, wherein the first configuration frame includes instructions for enabling an acknowledge function of the first responder device, the method comprising:
sending, from the first responder device to the commander device via the first segment of the differential bus, an acknowledge bit in response to a frame being received at the first responder device.

18. The method of claim 17, comprising masking the stream received from the second segment of the differential bus at the second communication port of the first responder device while sending the acknowledge bit by the first responder device.

19. The method of claim 17, comprising sending for a second time the first configuration frame in response to the commander device failing to receive the acknowledge bit from the first responder device after having sent the first configuration frame for the first time.

20. The method of claim 17, wherein the differential bus communication system further includes a first AND logic gate configured to apply AND logic processing to the second CAN reception signal produced by the second CAN transceiver circuit and the second CAN transmission signal produced by the CAN protocol controller and to produce the first CAN transmission signal.

* * * * *